United States Patent
Yoakum et al.

(10) Patent No.: US 9,264,534 B2
(45) Date of Patent: Feb. 16, 2016

(54) METHODS, SYSTEMS, AND COMPUTER-READABLE MEDIA FOR SELF-MAINTAINING INTERACTIVE COMMUNICATIONS PRIVILEGES GOVERNING INTERACTIVE COMMUNICATIONS WITH ENTITIES OUTSIDE A DOMAIN

(75) Inventors: John H. Yoakum, Cary, NC (US); Venkatesh Krishnaswamy, Holmdel, NJ (US)

(73) Assignee: Avaya Inc., Basking Ridge, NJ (US)

( * ) Notice: Subject to any disclaimer, the term of this patent is extended or adjusted under 35 U.S.C. 154(b) by 145 days.

(21) Appl. No.: 13/275,951

(22) Filed: Oct. 18, 2011

(65) Prior Publication Data
US 2013/0097292 A1    Apr. 18, 2013

(51) Int. Cl.
| | |
|---|---|
| G06F 15/177 | (2006.01) |
| H04L 9/32 | (2006.01) |
| H04M 3/42 | (2006.01) |
| H04L 12/00 | (2006.01) |
| H04L 12/58 | (2006.01) |

(Continued)

(52) U.S. Cl.
CPC ............... H04M 3/42 (2013.01); H04L 12/00 (2013.01); H04L 51/12 (2013.01); H04L 69/24 (2013.01); H04M 3/42136 (2013.01); H04M 7/006 (2013.01)

(58) Field of Classification Search
CPC ......... H04L 12/00; H04L 69/24; H04L 51/12; H04L 63/0236; H04L 63/102; H04M 3/42; H04M 7/006; H04M 3/42136
USPC .............. 726/1–4, 14, 21; 709/204, 224, 225, 709/206, 205, 221
See application file for complete search history.

(56) References Cited

U.S. PATENT DOCUMENTS

| | | | |
|---|---|---|---|
| 6,463,460 B1 * | 10/2002 | Simonoff ...................... | 709/203 |
| 8,549,622 B2 * | 10/2013 | Byrne et al. .................... | 726/21 |
| 8,799,983 B2 | 8/2014 | Yoakum | |

(Continued)

OTHER PUBLICATIONS

Non-Final Office Action for U.S. Appl. No. 13/194,341, mailed Jun. 18, 2013, 14 pages.

(Continued)

*Primary Examiner* — Shanto M Abedin
(74) *Attorney, Agent, or Firm* — Withrow & Terranova, PLLC

(57) ABSTRACT

Methods, systems, and computer-readable media for self-maintaining interactive communications privileges governing interactive communications with entities outside a domain are disclosed. The interactive communications privileges can be used to process interactive communications requests between entities inside a domain and entities outside the domain. Currently configured interactive communications privileges configured for an entity outside a domain may no longer be desired, reliable, or valid with the current capabilities of the entity outside the domain. In this regard, embodiments disclosed herein involve self-maintaining interactive communications privileges configured for entities outside a domain. Review of interactive communications privileges configured for entities outside a domain can be performed to determine if those interactive communications configurations should be maintained, in whole or part, or not maintained. In this manner, the burden and complexity of maintaining interactive communications privileges for entities outside the domain on a domain administrator or other administrator may be reduced or alleviated.

18 Claims, 13 Drawing Sheets

(51) Int. Cl.
*H04L 29/06* (2006.01)
*H04M 7/00* (2006.01)

(56) References Cited

U.S. PATENT DOCUMENTS

| | | | |
|---|---|---|---|
| 8,966,589 B2 | 2/2015 | Yoakum | |
| 2002/0010917 A1 | 1/2002 | Srikantan et al. | |
| 2003/0215067 A1 | 11/2003 | Ordille et al. | |
| 2004/0268153 A1 | 12/2004 | Goldthwaite et al. | |
| 2005/0153686 A1 | 7/2005 | Kall et al. | |
| 2005/0257099 A1 | 11/2005 | Bounkong et al. | |
| 2006/0095514 A1* | 5/2006 | Wang et al. | 709/204 |
| 2007/0022289 A1 | 1/2007 | Alt et al. | |
| 2007/0073880 A1* | 3/2007 | Krishnakumar et al. | 709/225 |
| 2007/0156900 A1* | 7/2007 | Chien | 709/225 |
| 2008/0022355 A1* | 1/2008 | Khosravi et al. | 726/1 |
| 2008/0098485 A1* | 4/2008 | Chiou | 726/27 |
| 2009/0025059 A1 | 1/2009 | Wang et al. | |
| 2009/0293099 A1* | 11/2009 | Yoakum | 726/1 |
| 2010/0045426 A1 | 2/2010 | Kakuta et al. | |
| 2010/0049573 A1* | 2/2010 | Kantorova et al. | 705/9 |
| 2011/0078081 A1 | 3/2011 | Pirzadeh et al. | |
| 2011/0179469 A1* | 7/2011 | Blinn et al. | 726/4 |
| 2011/0191847 A1 | 8/2011 | Davis et al. | |
| 2011/0209193 A1* | 8/2011 | Kennedy | 726/1 |
| 2011/0219434 A1 | 9/2011 | Betz et al. | |
| 2012/0011587 A1* | 1/2012 | Byrne et al. | 726/21 |
| 2012/0014271 A1 | 1/2012 | Damenti | |
| 2012/0197967 A1 | 8/2012 | Sivavakeesar | |
| 2012/0303808 A1* | 11/2012 | Xie | 709/225 |
| 2013/0031243 A1* | 1/2013 | Yoakum et al. | 709/224 |
| 2013/0055355 A1 | 2/2013 | Yoakum | |

OTHER PUBLICATIONS

Non-Final Office Action for U.S. Appl. No. 13/216,892, mailed Mar. 28, 2013, 22 pages.
Advisory Action for U.S. Appl. No. 13/216,892 mailed Dec. 20, 2013, 3 pages.
Non-Final Office Action for U.S. Appl. No. 13/194,341, mailed Nov. 12, 2013, 13 pages.
Final Office Action for U.S. Appl. No. 13/216,892, mailed Oct. 2, 2013, 25 pages.
Final Office Action for U.S. Appl. No. 13/194,341, mailed Apr. 3, 2014, 17 pages.
Advisory Action for U.S. Appl. No. 13/194,341, mailed Jun. 11, 2014, 3 pages.
Non-Final Office Action and Examiner-Initiated Interview Summary for U.S. Appl. No. 13/216,892, mailed May 29, 2014, 23 pages.
Notice of Allowance for U.S. Appl. No. 13/216,892, mailed Nov. 21, 2014, 9 pages.
Notice of Allowance for U.S. Appl. No. 13/194,341, mailed Apr. 3, 2015, 5 pages.

\* cited by examiner

ABSTRACT# METHODS, SYSTEMS, AND COMPUTER-READABLE MEDIA FOR SELF-MAINTAINING INTERACTIVE COMMUNICATIONS PRIVILEGES GOVERNING INTERACTIVE COMMUNICATIONS WITH ENTITIES OUTSIDE A DOMAIN

RELATED APPLICATIONS

The present application is related to U.S. patent application Ser. No. 13/194,341 filed on Jul. 29, 2011 and entitled "Methods, Systems, and Computer-Readable Media For Self-learning Interactive Communications Privileges For Governing Interactive Communications With Entities Outside A Domain," which is incorporated herein by reference in its entirety.

The present application is also related to U.S. patent application Ser. No. 13/216,892 filed on Aug. 24, 2011 and entitled "Methods, System, and Computer-Readable Media For Exception Handling Of Self-Learned Interactive Communications Privileges Governing Interactive Communications With Entities Outside A Domain," which is incorporated herein by reference in its entirety.

BACKGROUND

1. Field of the Disclosure

The technology of the disclosure relates to configuring and handling communications privileges in a domain/domain server for communications involving entities outside the domain.

2. Technical Background

Traditional switch-based phone communication systems provide simple mechanisms to allow a called party to control interactions with a calling party. For example, voice mail is one form of controlling interactions. If a called party does not answer a phone call from a calling party, the calling party may leave a voice mail for the called party. The called party phone calls may also be automatically directed to voice mail. In either scenario, the called party can retrieve the voice mail at their convenience and decide if a return phone call will be made to the calling party. Caller identification, also known as "caller id," is another form of controlling interactions. The called party can review the caller id of the calling party to identify the calling party and decide if the calling party phone call will be answered.

The Internet provides an infrastructure for establishing communications using data packet-based communications between entities. The entities may be user devices. For example, Session Initiation Protocol (SIP) was developed as one signaling protocol that could be used for establishing communications sessions in an Internet Protocol (IP) network. Voice over IP was also promoted adopting SIP as one protocol of choice. With SIP and other Internet Protocols developed for Internet communications, users or entities are identified by their associated domains. Domain names are used as part of a simple identification label under the Domain Name System (DNS) to indicate in which domain a user or other entity is associated. Other identification information, such as a user identification tag or address, can be associated with a domain name to provide a complete identification of a unique user or entity. Thus, one method of a first user or entity requesting to establish communications with a second user or entity, is for the first domain of the first user or entity to request contact with a second domain associated with the second user. The first domain server can make a DNS server request to find the IP address of the second domain server associated with the second domain user or entity to be contacted so that communications can be established. Thereafter, the first domain server can send an invite to the second user or entity at the second domain. If the second domain determines that the second user or entity exists within its domain, the invite can be handed off from the second domain server to the second user or entity to establish communications with the first user or entity.

One problem with this architecture for IP communications is that an outside system can spam users or entities in a given domain. An outside system can randomly make up addresses for a given domain to unsolicitedly contact users or entities in the domain. In this regard, domain servers may employ enterprise application software (EAS) in enterprise system configurations executed on a domain server to address spam and decide which communications are to be forwarded to its users or entities within its domain. A common example involves email communications. Enterprise systems may discriminate which email communications are forwarded to an addressed user or entity in its domain based on the address and/or domain of the user or entity outside the domain requesting email communications. However, this poses an issue for interactive communications, such as voice and video communications, as examples. For interactive communications, parsing and filtering may not maintain the interactive nature and integrity of the communications. Further, it may be desired to filter communications differently between users or entities within the same domain as opposed to communications outside a domain. Thus because of these issues, many enterprise systems choose not to employ SIP or other IP signaling protocols for communications with other systems outside its domain. The rationale is the potential of being flooded with unwanted invites and having to provide different filtering configurations based on whether communications are within the domain or with entities outside of the domain.

In response, federated database systems or federation systems have been developed and deployed in enterprise systems. Federation systems allow an administrator to setup and predefine, or provision, security rules or privileges ("federation rules") for IP communications from an outside domain to control relationships to users inside the domain of the enterprise system. For example, a federation system may be configured to allow SIP voice calls from an outside domain, but not allow SIP video calls from the outside domain. Further, these federation rules may be set on an individual user basis or particular groups or communities of users. A problem with federation systems is that over time, the federation rules become massive and difficult for administrators to maintain as a result of constant provisioning and relationships becoming outdated. The rules become too numerous and complex to effectively manage. Further, configuring communities of users often lacks enough granularity and often, multiple communal relationships are required, thereby requiring additional federation rules. Further, as federation rules are configured for additional outside domains with users or entities that are members of different domains, additional federation systems may be required to be deployed, further increasing complexity and federation rule maintenance issues.

Accordingly, there is a need for effectively and efficiently providing a way to configure and maintain privileges for interactive communications between users and entities within different domains that scales well as complexity increases.

SUMMARY OF THE DETAILED DESCRIPTION

Embodiments disclosed in the detailed description include methods, systems, and computer-readable media for self-maintaining interactive communications privileges governing interactive communications with entities outside a domain. As a non-limiting example, the domain may include an enterprise system. An entity can be an individual user within a domain, or a domain itself where multiple individual users are represented by the domain, or all known users in a domain. The interactive communications privileges can be used to process interactive communications requests between entities inside a domain and entities outside the domain. These requested interactive communications requests can be allowed if the interactive communications privileges configured for the entity outside the domain allow for the requested interactive communications.

The circumstances used as the basis to determine and configure the interactive communications privileges for entities outside a domain may change over time. As a non-limiting example, insight information for an entity outside a domain may have changed from the insight information used to configure the interactive communications for the entity outside the domain. Thus, the currently configured interactive communications privileges configured for an entity outside a domain may no longer be desired, reliable, or valid with the current capabilities of the entity outside the domain. In this regard, embodiments disclosed herein involve self-maintaining interactive communications privileges configured for entities outside a domain. Periodic or other review of interactive communications privileges configured for entities outside a domain can be performed to determine if those interactive communications configurations should be maintained, in whole or part, or not maintained. In this manner, the burden and complexity of maintaining interactive communications privileges for entities outside the domain on a domain administrator or other administrator may be reduced or alleviated.

In this regard in one embodiment, a method for self-maintaining interactive communications privileges governing interactive communications with entities outside a domain is provided. The method comprises receiving an update to at least one interactive communications privilege configured for an entity outside a domain governing interactive communications with an entity inside the domain. The method also comprises determining whether to maintain the at least one interactive communications privilege configured for the entity outside the domain in response to receiving the update to the at least one interactive communications privilege. The method also comprises maintaining the update to the at least one interactive communications privilege configured for the entity outside the domain governing interactive communications with the entity inside the domain if the at least one interactive communications privilege is determined to be maintained.

In another embodiment, a system for self-maintaining interactive communications privileges governing interactive communications with entities outside a domain is disclosed. In this embodiment, the system comprises at least one communications interface associated with a domain. The system also comprises a control system associated with the at least one communications interface and the domain. In this embodiment, the control system is configured to receive an update to at least one interactive communications privilege configured for an entity outside a domain governing interactive communications with an entity inside the domain. In response to receipt of the update to the at least one interactive communications privilege, the control system is also configured to determine whether to maintain the at least one interactive communications privilege configured for the entity outside the domain. If the at least one interactive communications privilege is determined to be maintained, the control system is configured to maintain the update to the at least one interactive communications privilege configured for the entity outside the domain governing interactive communications with the entity inside the domain.

In another embodiment, a computer-readable medium is provided. The computer-readable medium comprises computer executable instructions stored thereon to cause a control system associated with an at least one communications interface and a domain. The computer executable instructions cause the control system to receive an update to at least one interactive communications privilege configured for an entity outside a domain governing interactive communications with an entity inside the domain. The computer executable instructions also cause the control system to determine whether to maintain the at least one interactive communications privilege configured for the entity outside the domain in response to receipt of the update to the at least one interactive communications privilege. The computer executable instructions also cause the control system to maintain the update to the at least one interactive communications privilege configured for the entity outside the domain governing interactive communications with the entity inside the domain if the at least one interactive communications privilege is determined to be maintained.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
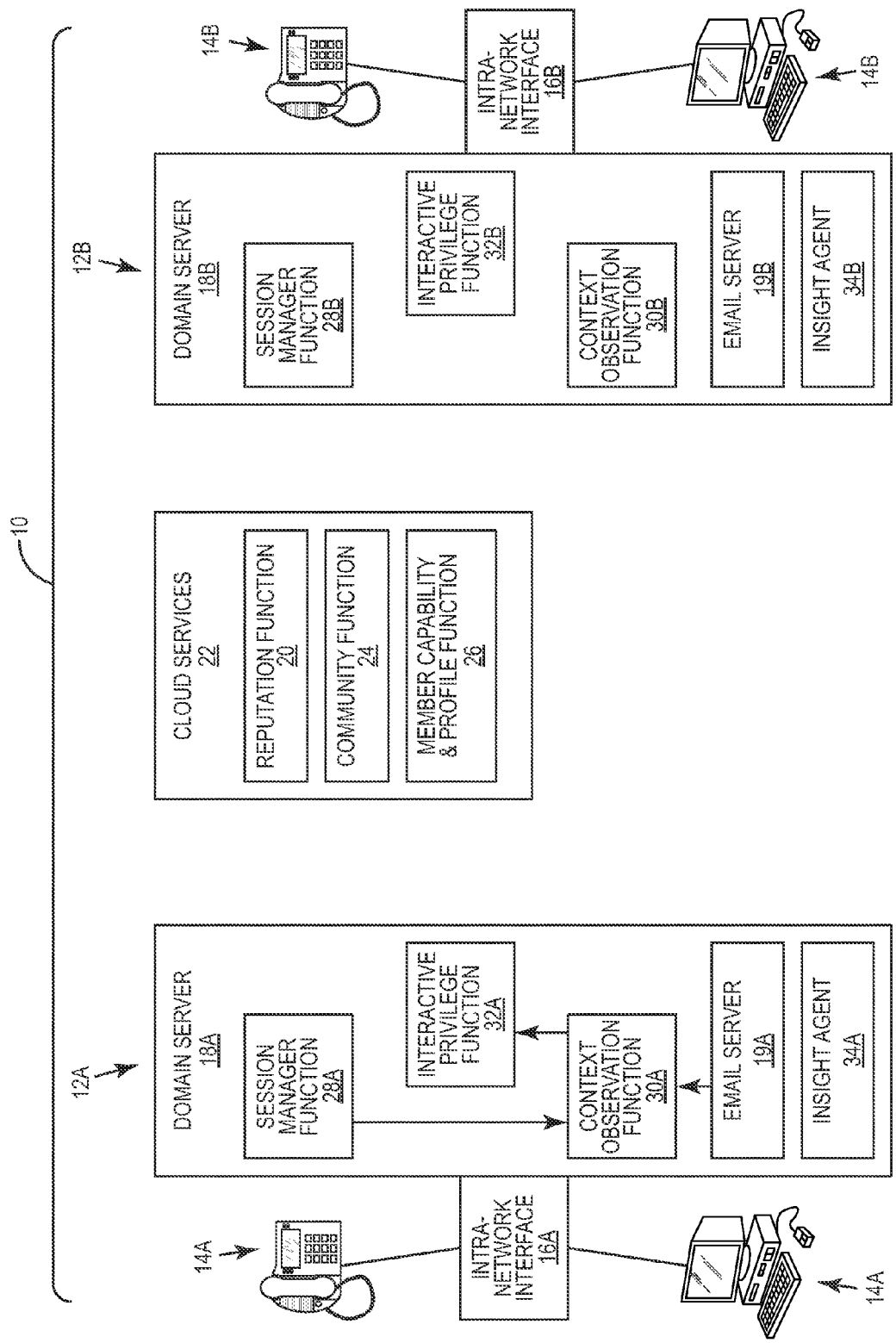
FIG. 1 is a block diagram of an exemplary system that includes domains configured to self-learn interactive communications privileges for communications with entities outside the domain.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include methods, systems, and computer-readable media for self-maintaining interactive communications privileges governing interactive communications with entities outside a domain. As a non-limiting example, the domain may include an enterprise system. An entity can be an individual user within a domain, or a domain itself where multiple individual users are represented by the domain, or all known users in a domain. The interactive communications privileges can be used to process interactive communications requests between entities inside a domain and entities outside the domain. These requested interactive communications requests can be allowed if the interactive communications privileges configured for the entity outside the domain allow for the requested interactive communications.

The circumstances used as the basis to determine and configure the interactive communications privileges for entities outside a domain may change over time. As a non-limiting example, insight information for an entity outside a domain may have changed from the insight information used to configure the interactive communications for the entity outside the domain. Thus, the currently configured interactive communications privileges for an entity outside a domain may no longer be desired, reliable, or valid with the current capabilities of the entity outside the domain. In this regard, embodiments disclosed herein involve self-maintaining interactive communications privileges configured for entities outside a domain. Periodic or other review of interactive communications privileges configured for entities outside a domain can be performed to determine if those interactive communications configurations should be maintained, in whole or part, or not maintained. In this manner, the burden and complexity of maintaining interactive communications privileges for entities outside the domain on a domain administrator or other administrator may be reduced or alleviated.

Figure 7:
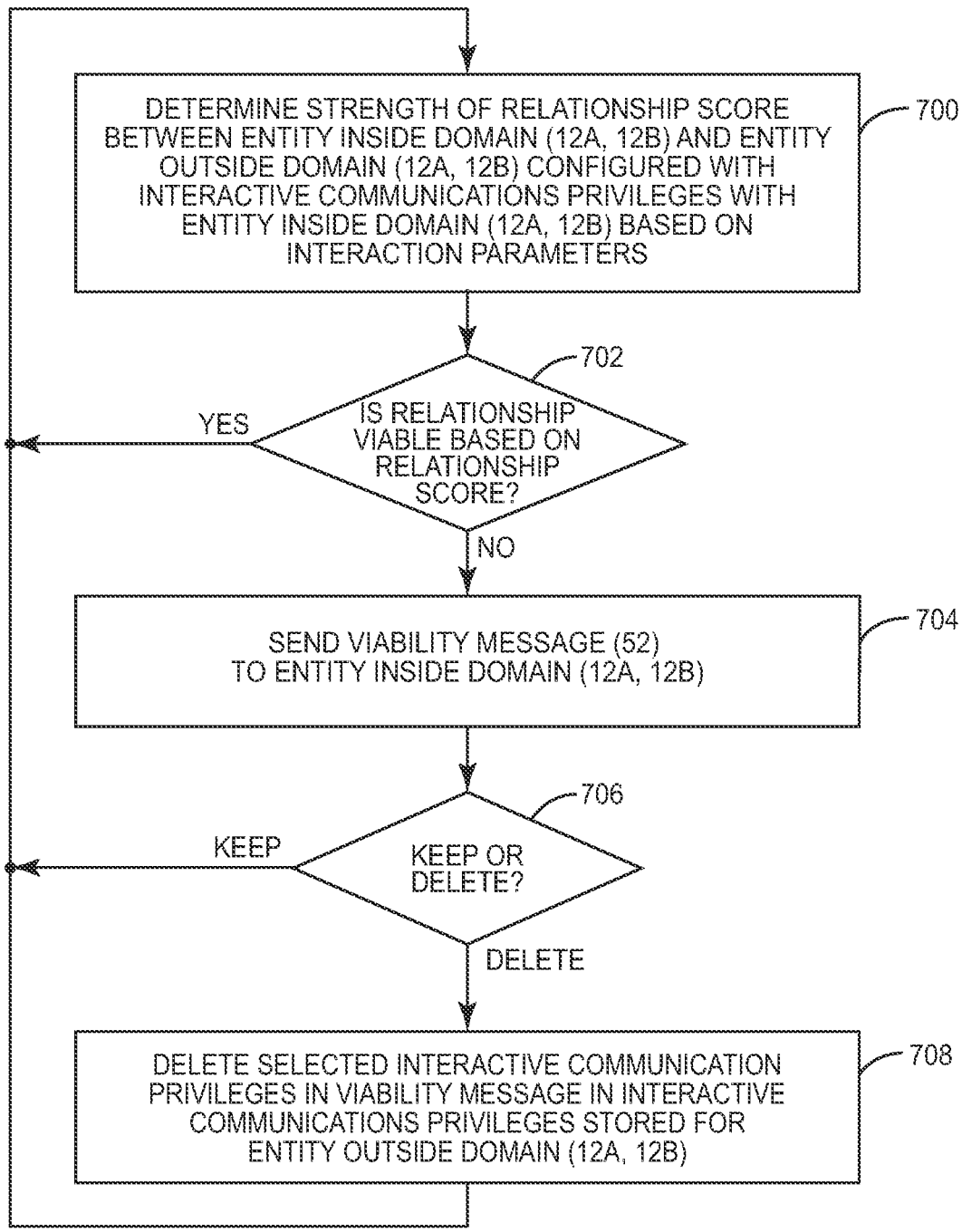
FIG. 7 is a flowchart illustrating an exemplary process for self-maintaining interactive communications privileges based on strength of relationship between entities inside the domain and entities outside the domain.

Before discussing specific examples of self-maintaining interactive communications privileges governing interactive communications with entities outside a domain starting at FIG. 7, an exemplary system in which these functions may be provided is first discussed. In this regard, FIG. 1 illustrates such an exemplary system 10. The system 10 in this example includes two exemplary domains 12A, 12B, although any number of domains can be included in the system 10. The domains 12A, 12B identify a realm of administrative autonomy, authority, or control that is governed by a common set of rules. The domains 12A, 12B may have associated domain names that provide an identification label for identifying the domains 12A, 12B for communications in the Internet (e.g., [identification_label].com). In this example, each domain 12A, 12B is configured to support a plurality of user devices 14A, 14B connected via intra-network interfaces 16A, 16B, respectively, to the domain 12A, 12B. The user devices 14A, 14B are examples of entities. Entities with the domains 12A, 12B can also involve other devices that are not necessarily user devices or user controlled. The user devices 14A, 14B could be, as examples, IP telephones, computers, and other network devices.

The domains 12A, 12B may each include domain servers 18A, 18B, respectively, that contain a collection of computer programs that collectively serve the needs of the domain. For example, the domain servers 18A, 18B may be enterprise servers or enterprise domain servers. One service provided by the domain servers 18A, 18B is supporting communications between user devices 14A, 14B within the same domain 12A, 12B, also referred to as intra-domain communications. The domain name is not required for intra-domain communications. The domain servers 18A, 18B also support inter-domain communications between user devices 14A, 14B in different domains 12A, 12B. In inter-domain communications, the domain names form part of the identification of the user devices 14A, 14B to identify their respective domains. It should be understood that for the sake of simplicity of explanation, domain servers 18A, 18B are illustrated as single servers. The functions shown within these domain servers 18A, 18B can be implemented all in a single server or in several servers that interact with each other to accomplish the overall set of functions described in relation to domain servers 18A, 18B.

With continuing reference to FIG. 1, each domain server 18A, 18B may contain a respective email server 19A, 19B. The email servers 19A, 19B include applications that receive and process email messages from entities or clients within their domains 12A, 12B, and entities outside their domains 12A, 12B. Email messages are a form of asynchronous communications. Email messages are not generally thought of as interactive communications. Interactive communications typically include communications that involve synchronous interaction, such as voice, video, and instant messaging (IM), as non-limiting examples. The email servers 19A, 19B contain a storage area for storing emails and rules that govern how the email servers 19A, 19B should react when determining the destination of a specific message or how to reach a sender of the message. The email messages processed by the email servers 19A, 19B include sender and destination addresses. If an email message is intended to be sent to another entity inside the same domain as the domain of the sender, a domain name may not be required to be included in the recipient address. If an email message is intended to be sent to an entity outside the domain of the sender, a domain name is included in the recipient address.

With continuing reference to FIG. 1, as will be discussed in more detail below, each of the domain servers 18A, 18B are configured to self-learn interactive communications privileges for entities located outside of their respective domains. The interactive communications privileges can be used to process interactive communications requests between entities inside a domain and entities outside the domain. The requested interactive communications are allowed if the interactive communications privileges configured for the entity outside the domain allow for the requested interactive communications. An entity can be an individual user within a domain, or a domain itself where multiple individual users are represented by the domain, or all known users in a domain. The interactive communications privileges are determined in an automated, self-learning manner in response to monitoring communications interactions between the entities outside the domain and entities inside the domain. In this manner, the interactive communications privileges are not required to be provisioned and maintained by an administrator. In this example, user devices 14A are entities inside the domain 12A, and user devices 14B are entities inside the domain 12B. User devices 14B are entities outside of the domain 12A, and user devices 14A are entities outside the domain 12B. It may be important for the domain servers 18A, 18B, to control communications with entities inside their domain (e.g., user devices 14A, 14B, respectively), and entities outside their domain (e.g., user devices 14B, 14A, respectively).

The domain servers 18A, 18B control establishing of communications between entities inside and outside their respective domains 12A, 12B. The domain servers 18A, 18B make decisions whether or not to allow communications to be established with entities outside their respective domains 12A, 12B. Whether establishing of communications is allowed can be based on server factors or information. This information can be included in the identity of the domain, the membership communities of the entity outside the domain, the reputation of the entity outside the domain, the trustworthiness of the entity outside the domain, and/or the communication capabilities of the entity outside the domain, as non-limiting examples. Each of these types of information are examples of insight information that is useful in determining whether establishing of interactive communications should be allowed, and if so, what types of communications, media flows, information exchanges, availability insight, and other nuances of interactive communications are permissible.

As one example of insight information, the reputation of an entity outside a domain may be determined by the domain servers 18A, 18B by calling upon a reputation function 20. The reputation of an entity can be the reputation of the domain if the entity is the domain. In this example, all user entities within the domain in essence inherit the reputation of the domain. Alternatively, the reputation of an entity can be the reputation of an individual user or groups of users within a domain. As illustrated in FIG. 1, the reputation function 20 may be provided in cloud services 22 external to the domains 12A, 12B. The reputation service 20 in the cloud services 22 may be called upon by a domain server 18A, 18B. The reputation function 20 contains reputation information regarding entities. The reputation of the entity outside a domain 12A, 12B may be used by a domain server 18A, 18B to determine whether to allow establishment of interactive communications with entities inside their respective domains 12A, 12B, and if so, what type of interactive communications to allow. The reputation function 20 could also be provided outside of the cloud services 22, including in internal domains and outside domains, including either of domains 12A, 12B.

As another example of insight information, the communities in which an entity outside a domain is a member or a part of may be determined by the domain server 18A, 18B by calling upon a community function 24. For example, an entity may belong to a community of SIP programmers. Communities can also involve societal, professional, technical, business, and other groups and affiliations. A domain itself may belong to a community and insight about this membership of the domain may be considered by domain server 18A, 18B. As illustrated in FIG. 1, the community function 24 may be provided in cloud services 22 external to the domains 12A, 12B which may be called upon as a service to call upon the community function 24. The community function 24 could also be provided outside of the cloud services 22, including in other domains, including domain servers 18A, 18B. The community function 24 contains community information regarding entities. The communities in which an entity outside a domain is a member or part of may be used by a domain server 18A, 18B to determine whether to allow establishment of interactive communications with entities inside their domains 12A, 12B, respectively, and if so, what type of interactive communications to allow.

As another example of insight information, the interactive communications capabilities or profile of an entity outside a domain may be determined by the domain server 18A, 18B by calling upon a member capability and profile function 26. As illustrated in FIG. 1, the member capability and profile function 26 may be provided in cloud services 22 external to the domains 12A, 12B which may be called upon as a service to call upon the member capability and profile function 26. The member capability and profile function 26 could also be provided outside of the cloud services 22, including in other domains, including domain servers 18A, 18B. The member capability and profile function 26 contains capability and profile information regarding entities. For example, a given entity may only have capabilities to communicate in certain manners (e.g., email communications, but not video communications). As another example, a profile provided for an entity may provide for certain types of communications and not others (e.g., email communications, not video or whiteboard communications). The capabilities and/or profiles of entities outside a domain may be used by a domain server 18A, 18B to determine whether to allow establishment of interactive communications with entities inside their respective domains 12A, 12B, and if so, what type of interactive communications to allow. Those skilled in the art will recognize that other types of insight describing a domain 12A, 12B and/or entity may be acquired and used in a similar fashion to the examples described and all such forms of insight fall within the scope of this disclosure.

Each domain server 18A, 18B contains several components that facilitate intra-network and inter-network communications with entities inside their respective domains 12A,

12B, including their respective user devices 14A, 14B. For example, a session manager function 28A, 28B may be provided in each of the domain servers 18A, 18B. The session manager functions 28A, 28B control establishment of communication sessions between entities inside their respective domains 12A, 12B, and entities inside their domains 12A, 12B with entities outside their domains 12A, 12B. As an example, the session manager functions 28A, 28B may be configured to handle a particular signaling protocol or protocols to handle communication establishment requests and establishments, such as SIP for establishing sessions in an IP network. The ability of the session manager functions 28A, 28B to establish these sessions means that a host of innovative, interactive communications services may be possible. Non-limiting examples of these interactive communications services include voice, video, IM, file share, availability insight, location insight, web share, and shared whiteboard.

As previously discussed, one problem with this architecture for IP communications is that an outside system can spam users or entities in a given domain. An outside system can randomly make up addresses for a given domain to unsolicitedly contact users or entities in the domain. Enterprise systems may discriminate which email communications are forwarded to an addressed user or entity in its domain based on the address and/or domain of the user or entity outside the domain requesting email communications. For interactive communications, parsing and filtering may not maintain the interactive nature and integrity of the communications. Further, it may be desired to filter communications differently between users or entities within the same domain as opposed to communications outside a domain. Thus because of these issues, many enterprise systems choose not to employ SIP or other IP signaling protocols for communications with other systems outside its domain. The rationale is to mitigate the potential of being flooded with unwanted invites and having to provide different filtering configurations based on whether communications are within the domain or with entities outside of the domain.

In response, federated database systems or federation systems have been developed and deployed in enterprise systems. A problem with federation systems is that over time, the federation rules become massive and difficult for administrators to maintain as a result of constant provisioning and relationships becoming outdated. The rules become too numerous and complex to effectively manage. Further, configuring communities of users often lacks enough granularity and often, multiple communal relationships are required, thereby requiring additional federation rules. Further, as federation rules are configured for additional outside domains with users or entities that are members of different domains, additional federation systems may be required to be deployed, further increasing complexity and federation rule maintenance issues.

As a non-limiting example, the domain servers 18A, 18B in FIG. 1 are configured to allow for default email and voice communications without calling upon the interactive communications privileges, which are discussed in more detail below. Several components and functionalities are included in the domain servers 18A, 18B that govern interactive communications from entities outside their domains 12A, 12B. As will be discussed in more detail below and in response to the issues discussed above, these components and functionalities provide for self-learning of interactive communications privileges for governing interactive communications with entities outside their respective domains 12A, 12B.

Note that email and voice communications with entities outside the domain 12A, 12B are allowed in this example regardless of whether interactive communications privileges have been established with the entity outside the domain 12A, 12B. This is because the self-learning of interactive communications privileges for entities outside the domains 12A, 12B is triggered based on initial communications between entities inside the domains 12A, 12B and entities outside the domains 12A, 12B. Thus, some form of default communications (e.g., email and/or voice) between entities in a domain 12A, 12B and entities outside the domain 12A, 12B is provided and allowed regarding interactive communications privileges configured for the entities outside the domain 12A, 12B. The interactive communications governed by the interactive communications privileges herein may be a richer set of communications types than those provided as default allowed communications types, such as email and/or voice communications as non-limiting examples. As non-limiting examples, interactive communications governed by the interactive communications privileges herein may be synchronous communications and/or real-time communications.

Figure 2:
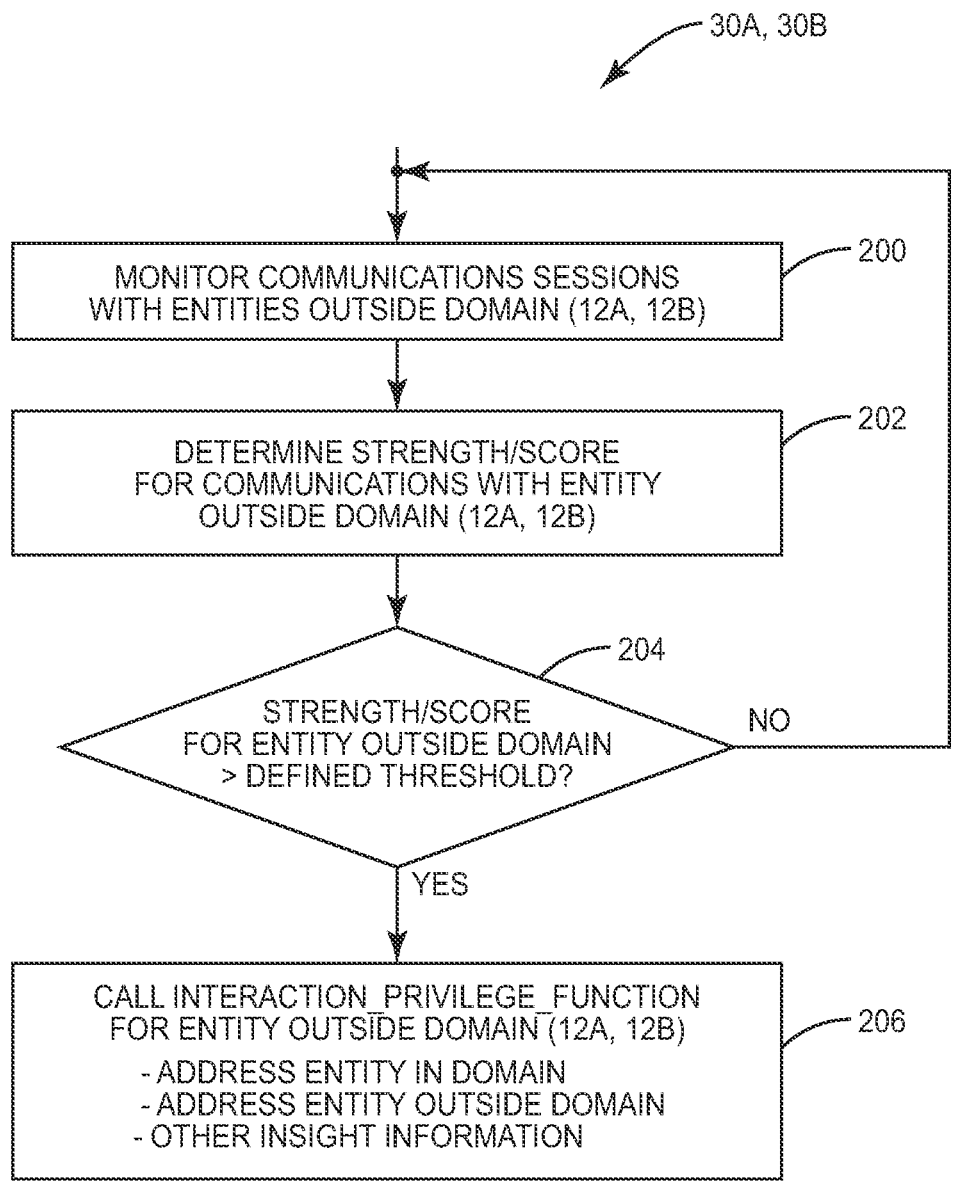
FIG. 2 is a flowchart illustrating exemplary functions of a contextual observation function configured to obtain contextual observation information about an entity outside the domain.

In this regard, each of the domain servers 18A, 18B include context observation functions 30A, 30B, which will be discussed with reference to FIGS. 1 and 2 below. FIG. 2 is a flowchart that illustrates exemplary operation of the context observation functions 30A, 30B. The context observation functions 30A, 30B monitor communications with entities inside their respective domains 12A, 12B, including communications between entities outside their respective domains 12A, 12B (block 200 in FIG. 2). As examples, the session manager functions 28A, 28B may either report communications to the context observation functions 30A, 30B, or the context observation functions 30A, 30B can poll the session manager functions 28A, 28B. In this example, the context observation functions 30A, 30B are not concerned with monitoring intra-domain communications, the entities inside the domains 12A, 12B are trusted and their interactive communications capabilities are known. The context observation functions 30A, 30B determine the strength of the communications between entities inside their domains 12A, 12B and entities outside their domains 12A, 12B (block 202 in FIG. 2), because it may not be desired to attempt to self-learn interactive communications privileges for entities outside the domain 12A, 12B until a certain threshold of interactions with the entities outside the domain 12A, 12B has been exceeded. As an example, these communications may score the communications between entities inside the domains 12A, 12B and entities outside the domains 12A, 12B. The scoring may be based on the number and/or length of the communications as non-limiting examples.

With continuing reference to FIGS. 1 and 2, if the strength or score of the communications between an entity inside the domain 12A, 12B and an entity outside the domain 12A, 12B does not exceed a defined threshold (decision 204 in FIG. 2), the process repeats by continuing to monitor communication sessions (block 200 in FIG. 2). For example, the defined threshold may be a defined threshold communications level. If the strength or score of the communications between an entity inside the domain 12A, 12B and an entity outside the domain 12A, 12B does exceed a defined threshold (decision 204 in FIG. 2), the context observation functions 30A, 30B will call upon respective interactive privilege functions 32A, 32B in their domain servers 18A, 18B, as illustrated in FIG. 1 (block 206 in FIG. 2). As will be discussed in more detail below, the interactive privilege functions 32A, 32B determine interactive communications privileges for the entity outside the domain 12A, 12B. The interactive communications privileges will govern future interactive communications between entities inside their respective domain 12A, 12B and entities outside their respective domains 12A, 12B. The address of the entity inside the domain 12A, 12B and the address of the entity outside the domain 12A, 12B are passed to the interactive privilege functions 32A, 32B. Any other available insight information about the entity outside the domain 12A, 12B is also provided to the interaction privilege functions 32A, 32B. For example, the domain servers 18A, 18B may call upon respective insight agents 34A, 34B that can gather and/or provide insight information about entities. More information on insight agents that may be employed as the insight agents 34A, 34B herein is disclosed in U.S. patent application Ser. No. 12/125,644 filed on May 22, 2008 entitled "Insight Distribution," which is incorporated herein by reference in its entirety.

Figure 3:
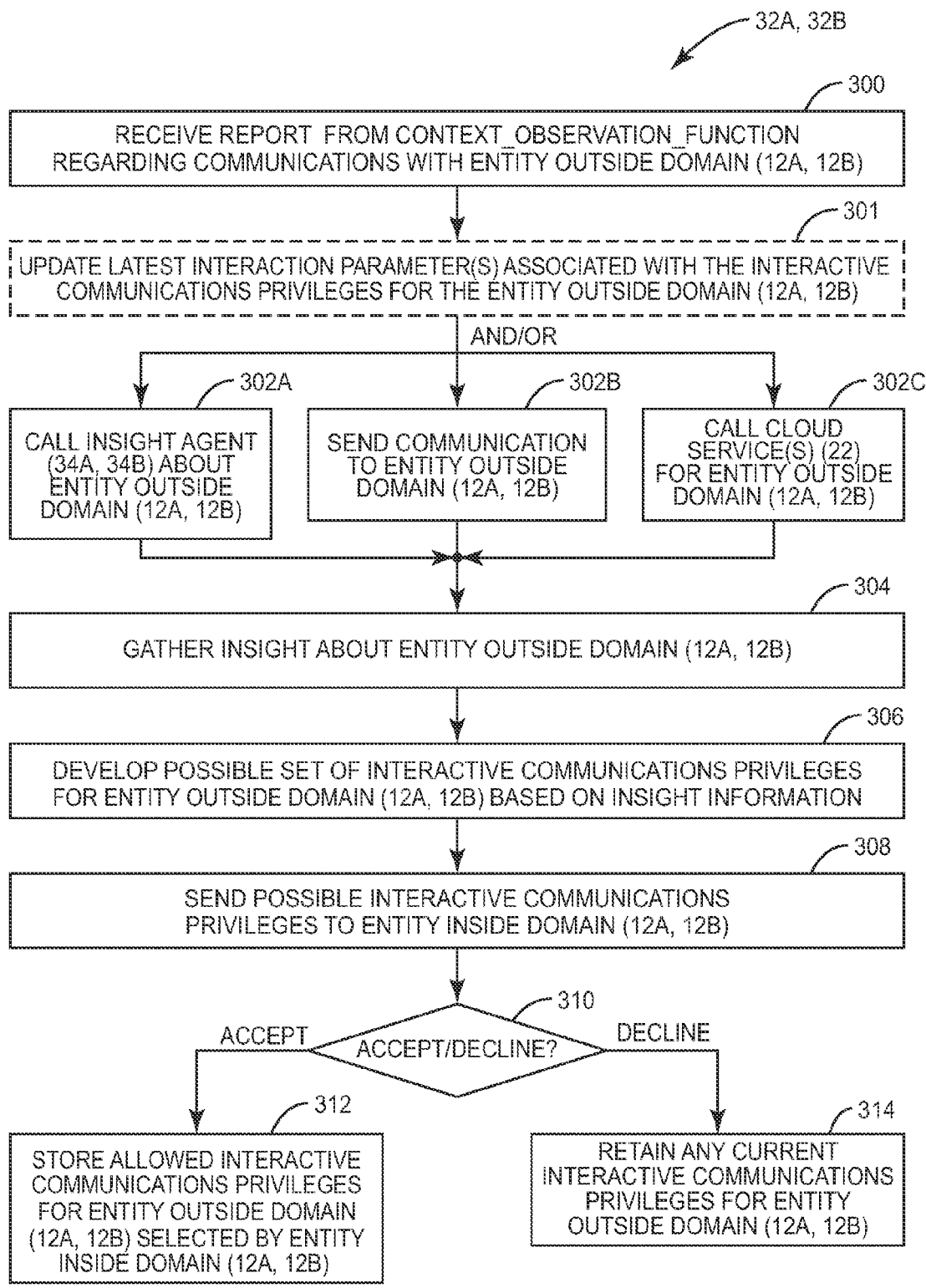
FIG. 3 is an exemplary flowchart illustrating exemplary functions of an interactive privilege function configured to provide self-learning interactive communications privilege configurations for an entity outside the domain.

FIG. 3 is an exemplary flowchart illustrating exemplary functionality of the interactive privilege functions 32A, 32B. The interactive privilege functions 32A, 32B are provided in the domain servers 18A, 18B and are configured to provide self-learning interactive communications privilege configurations for entities outside their respective domains 12A, 12B. The interactive privilege functions 32A, 32B receive a communications report from their respective context observation functions 30A, 30B regarding communications involving entities outside their respective domains 12A, 12B (block 300 in FIG. 3). As discussed above and illustrated in FIG. 2, the interactive privilege function 32A, 32B is called upon in this embodiment if the interactions between an entity inside the domain 12A, 12B and an entity outside the domain 12A, 12B exceed a defined threshold (blocks 204, 206 in FIG. 2).

With continuing reference to FIG. 3, after the interactive privilege function 32A, 32B is invoked, one or more previous or last interaction parameters ("last interaction parameter(s)") associated with the entity outside the domain 12A, 12B may be updated. The last interaction parameter is updated based on this interactive communications request between the entity inside the domain 12A, 12B and the entity outside the domain 12A, 12B (block 301 in FIG. 3). As will be discussed in more detail below with regard to FIG. 9, the last interaction parameter(s) can be used to determine whether one or more interactive communications privileges for an entity outside the domain 12A, 12B should be maintained. As a non-limiting example, the last interactions parameter may include the time of the interaction request between the entity inside the domain 12A, 12B and the entity outside the domain 12A, 12B. Thus, it can later be determined if a significant time has elapsed since the last interaction between the entity inside the domain 12A, 12B and the entity outside the domain 12A, 12B. If too much time has elapsed, this may be an indication that the interactive communications privileges configured for the entity outside the domain 12A, 12B is stale and should not be maintained. Default interactive communications privileges may be established or re-established for the entity outside the domain 12A, 12B in lieu of customized interactive communications privileges, as will be discussed in more detail below.

With continuing reference to FIG. 3, the interactive privilege functions 32A, 32B can next determine insight about the entity outside the domain 12A, 12B to configure the interactive communications privileges for the entity outside the domain 12A, 12B. In this regard, the interactive privilege functions 32A, 32B can call upon one or more resources that may be available to determine insight about the entity outside the domain 12A, 12B. Insight may be information that is useful in determining which interactive communications privileges to configure for an entity outside the domain 12A, 12B. As non-limiting examples, insight information can include interactive communications capabilities, permissions, associations, trustworthiness, and/or reputation information. For example, the interactive privilege function 32A, 32B may call upon its respective insight agent 34A, 34B to determine insight about the entity outside the domain 12A, 12B (block 302A in FIG. 3). The interactive privilege function 32A, 32B may also send a communication to the entity outside the domain 12A, 12B to inquire as to their interactive communications capabilities or gain other insight about the entity outside the domain 12A, 12B (block 302B in FIG. 3). The interactive privilege function 32A, 32B may also call upon one or more of the cloud services 22 to determine insight about the entity outside the domain 12A, 12B (block 302C in FIG. 3). The interactive privilege functions 32A, 32B may call upon any number of these insight sources to gather insight about the entity outside the domain 12A, 12B as illustrated in the system 10 in FIG. 4 (block 304 in FIG. 3).

Figure 4:
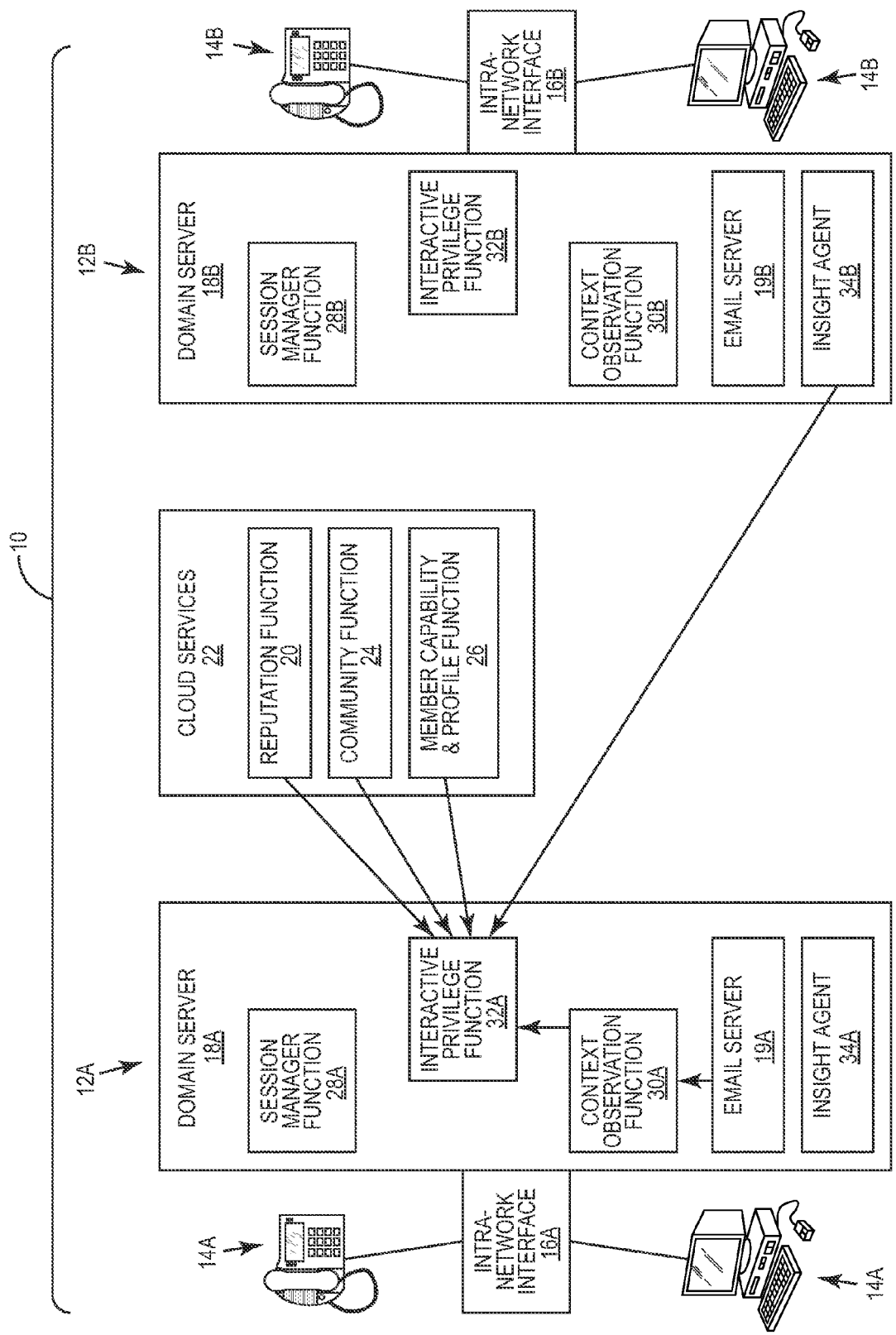
FIG. 4 is the exemplary system of FIG. 1 illustrating that a domain can receive insight information from various sources about an entity outside the domain.

As illustrated in FIG. 4, the interactive privilege function 32A is illustrated as being able to call upon the cloud services 22, particularly the reputation function 20, the community function 24, and/or the member capability and profile function 26. The interactive privilege function 32A is also illustrated in FIG. 4 as being able to call upon the insight agent 34B of the domain 12B to gain insight on an entity outside the domain 12A and inside the domain 12B. Although not illustrated in FIG. 4, the interactive privilege function 32B can call upon the same functions and insight agent 34A of domain 12A to gain insight on an entity outside the domain 12B and inside the domain 12A. It should be understood by those skilled in the art that any number of insight sources located either inside the domains 12A, 12B or inside any other domains that have insight about the domains 12A, 12B may be called upon to provide insight by the interactive privilege function 32A, 32B.

Figure 5:
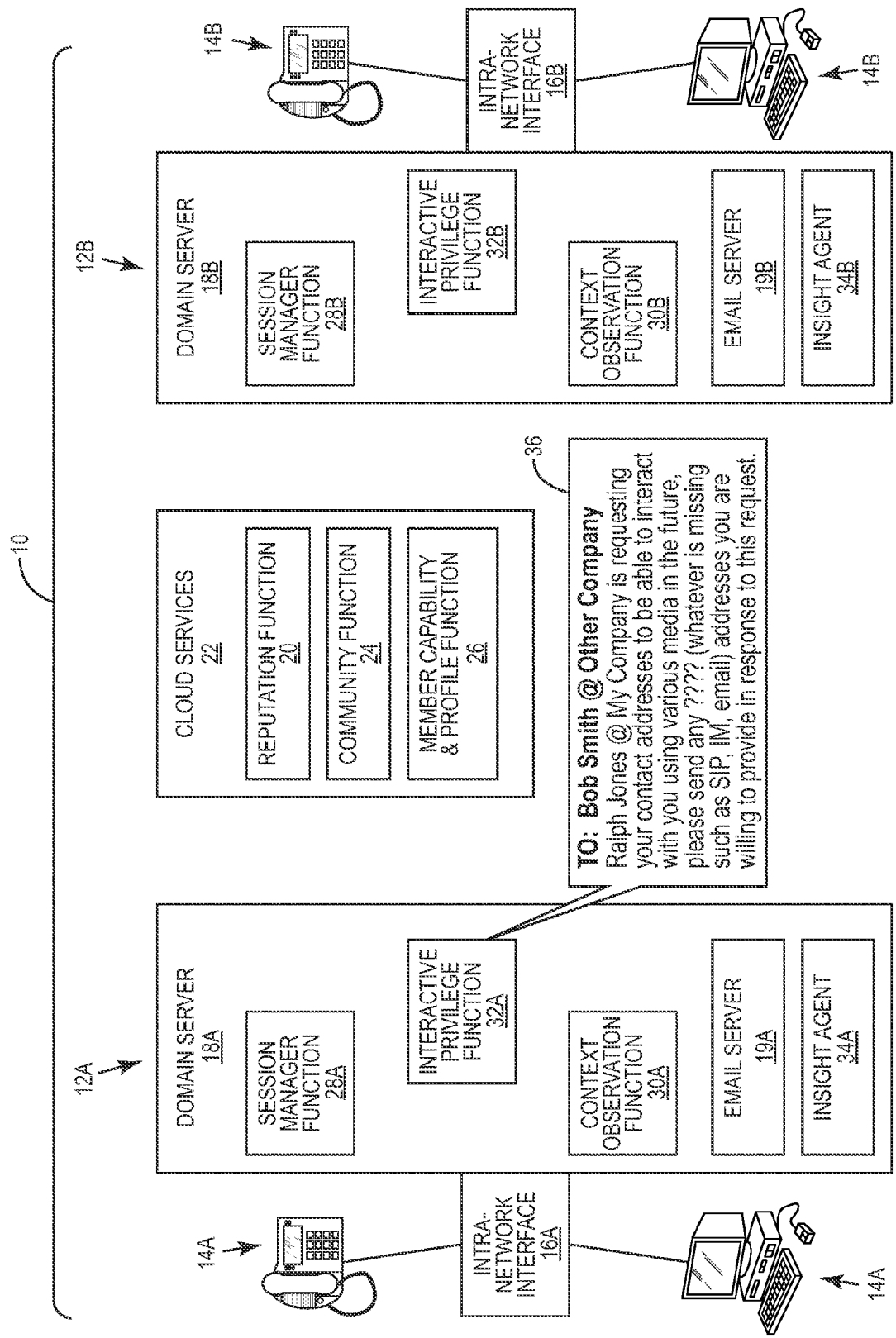
FIG. 5 is the exemplary system of FIG. 1 illustrating an exemplary message composed by the interactive privilege function to gather insight about an entity outside the domain which can be used to determine interactive communications privileges for the entity outside the domain.

As discussed above, one option (shown in block 302B in FIG. 3) for the interactive privilege functions 32A, 32B to gather insight about an entity outside its respective domain 12A, 12B is to send a communication message to the entity outside the domain 12A, 12B to inquire as to their interactive communications capabilities and related address or other insight. This option is illustrated by example in the system 10 in FIG. 5. This option for gathering insight about an entity outside the domain 12A, 12B may be taken if, for example, insight cannot be gathered about the entity outside the domain 12A, 12B by other means or gained with the sufficient or desired detail. As illustrated in FIG. 5, the interactive privilege function 32A in domain 12A is shown as having compiled a message 36 to be sent to Bob_Smith@Other_Company. Bob_Smith may be a user entity in the domain 12B. In this example, the "Other_Company" domain name identifies domain 12B. The message 36 is compiled by the interactive privilege function 32A based on monitoring of interaction communications between Bob_Smith@Other_Company with Ralph_Jones@My_Company. Ralph_Jones is a user entity in domain 12A (see also, block 200 in FIG. 2). The "My_Company" domain name identifies domain 12A in this example.

With continuing reference to FIG. 5, the message 36 compiled by the interactive privilege function 32A indicates that user entity Ralph_Jones at domain My_Company (12A) is attempting to contact user entity Bob_Smith at domain Other_Company (12B) to gather insight information about user entity Bob_Smith. The message 36 asks Bob_Smith to send its communications capabilities and addresses for such capabilities to the My_Company domain (12A). The interactive privilege function 32A will receive insight information from Bob_Smith if Bob_Smith responds to message 36.

Whether Bob_Smith responds to the message 36 (e.g., block 302B in FIG. 3), or whether insight about Bob_Smith is gathered through other means (e.g., blocks 302A, 302C in FIG. 3), the interactive privilege function 32A will thereafter develop a possible set of interactive privileges for the entity outside the domain 12A based on the received insight information (block 306 in FIG. 3). In the present example, the interactive privilege function 32A will develop a possible set of interactive privileges for the user entity Bob_Smith outside the domain 12A, in the domain 12B based on the received insight information.

Figure 6:
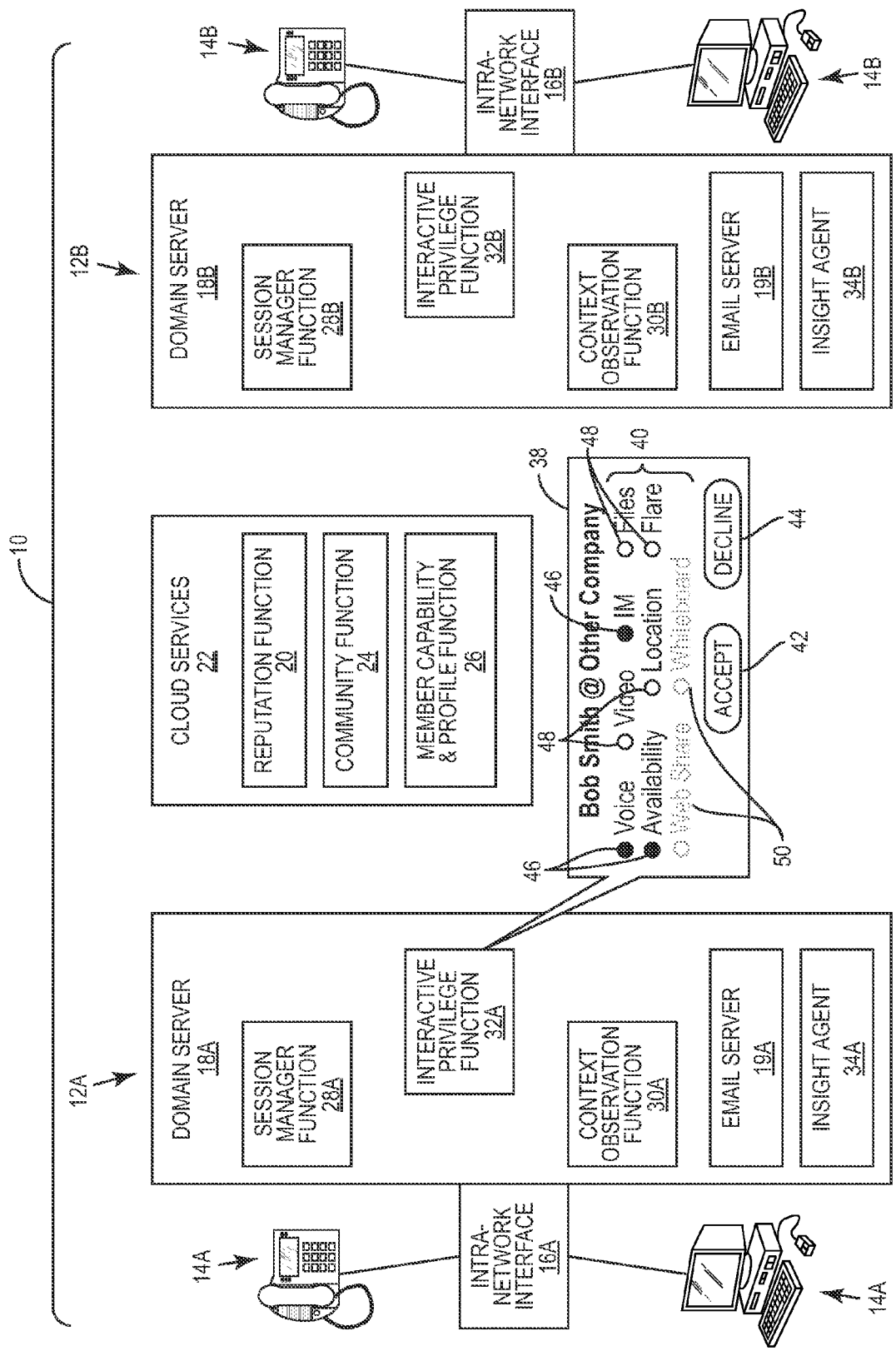
FIG. 6 is the exemplary system of FIG. 1 illustrating the exemplary interactive privilege function providing allowed and recommended interactive communications privileges to an entity inside the domain regarding interactive communications with an entity outside the domain.

As illustrated by example in the system 10 in FIG. 6, the interactive privilege function 32A will thereafter send the developed set of interactive communications privileges 40 for the entity outside the domain 12A to the entity inside the domain 12A (block 308 in FIG. 3). In this example, the entity inside the domain 12A is user entity Ralph_Jones. Non-limiting examples of the interactive communications privileges 40 include voice communications, video communications, instant messaging (IM), file sharing, availability insight, location insight, web sharing, shared "Whiteboard", and the Avaya Flare® capability suite. Flare® is an interactive user interface enabling a variety of communications capabilities developed and marketed by Avaya Inc., 211 Mount Airy Road, Basking Ridge, N.J. 07920, and is disclosed in more detail in U.S. patent application Ser. No. 12/948,140 filed on Nov. 17, 2010 entitled "Method And System For Controlling Audio Signals In Multiple Concurrent Conference Calls," which is incorporated herein by reference in its entirety.

As illustrated in FIG. 6, a pop-up message 38 is sent by the interactive privilege function 32A to the entity inside the domain 12A with pre-populated interactive communications privileges. The pop-up message 38 indicates that Voice, IM, and Availability interactive communications privileges are recommended to Ralph_Jones as interactive communications privileges 40 for interactive communications with the user entity Bob_Smith@Other_Company. Radio buttons 46 are automatically selected by the interactive privilege function 32A in the pop-up message 38 for recommended interactive communications privileges 40. The user entity inside the domain 12A, Ralph_Jones, can unselect any of the recommended interactive communications privileges so that they are not included in the interactive communications privileges 40 configured for the user entity outside the domain 12B, Bob_Smith. Radio buttons 48 not automatically selected by the interactive privilege function 32A, 32B indicate interactive communications privileges 40 that are allowed, but not recommended for selection by the user entity inside the domain 12A, Ralph_Jones. The user entity inside the domain 12A, 12B can select any of radio buttons 48 to add these interactive communications privileges to the configured interactive communications privileges 40. Two interactive communications privileges in the pop-up message 38 in FIG. 6, "Web Share" and "Whiteboard," 50 are grayed out. This means that the interactive privilege function 32A, 32B is not automatically allowing these interactive communications privileges to be selected by the user entity inside the domain 12A, 12B to be configured for the interactive communications privileges 40 for the user entity outside the respective domain 12A, 12B.

With continuing reference to FIG. 6, the user entity Ralph_Jones can choose to accept or decline these proposed interactive communications privileges 40 by selecting either the "ACCEPT" button 42 or the "DECLINE" button 44, respectively (block 310 in FIG. 3). A user entity's ability inside the domain 12A, 12B to choose among recommended and allowed interactive communications privileges 40 for the entity outside the domain 12A, 12B provides the self-learning of interactive communications privileges 40 in this example. In this manner, an administrator is not tasked with maintaining all of the interactive communications privileges in a given domain 12A, 12B. The user entity can also choose to select other unselected radio buttons 48 to add additional interactive communications privileges 40 for the entity outside the domain 12A, 12B (e.g., Video, Files, Location, and Flare®). The user entity can also choose to unselect selected radio buttons 46 to remove specific interactive communications privileges 40 for the entity outside the domain 12A, 12B (e.g., "Voice," "IM," and/or "Availability"). As will be discussed below in more detail with regard to FIG. 10, interactive communications privileges will be used to determine whether a particular type of interactive communications session will be allowed to be established by a domain server 18A, 18B.

With continuing reference to FIG. 6, if the user entity Ralph_Jones accepts the allowed selected interactive communications privileges 40 for the user entity Bob_Smith, the selected interactive communications privileges 40 (e.g., in this example: Voice, IM, and Availability) will be stored in the domain 12A as the interactive communications privileges 40 for interactive communications between the user entity Ralph_Jones in domain 12A and the user entity Bob_Smith in domain 12B (block 312 in FIG. 3). If the user entity Ralph_Jones declines any allowed interactive communications privileges 40 for the user entity Bob_Smith, system default interactive communications privileges stored for user entity Bob_Smith in domain 12B, if any were previously stored, will be retained (block 314 in FIG. 3). In either scenario, the interactive communications privileges 40 will be used by a domain server 18A, 18B to determine whether to establish requested interactive communications with entities outside their respective domain 12A, 12B.

The embodiments discussed above involve configuring interactive communications privileges for interactive communications with entities outside the domain 12A, 12B. However, the circumstances used as the basis to determine and configure the interactive communications privileges for entities outside the domain 12A, 12B may change. For example, insight information for an entity outside a domain 12A, 12B may have changed from the insight information previously used to configure the interactive communications privileges for the entity outside the domain 12A, 12B. For example, insight information regarding the reputation, community, capability, and/or profile of the entity outside the domain 12A, 12B and/or its outside domain 12A, 12B, may have changed. As another example, insight information for an entity outside the domain 12A, 12B may have been updated in the cloud services 22 (e.g., see above and clouds services 22 in FIG. 4). As another example, insight information for an entity outside the domain 12A, 12B, retrievable through a call to the insight agent 34A, 34B of the outside domain 12A, 12B, may have been updated in the outside domain 12A, 12B (e.g., see above and FIG. 4).

In this regard, it may be desirable to review interactive communications privileges configured for entities outside a domain 12A, 12B to determine if those configurations should be maintained in whole or part, or not maintained. This review may be periodic, and may or may not be scheduled. The review may be triggered on other criteria or parameter(s). If it is determined not to maintain interactive communications privileges previously configured for an entity outside the domain 12A, 12B, the interactive communications privileges for the entity outside the domain 12A, 12B may be set to default communications privileges (e.g., email and voice). It may also be desirable to provide for automatic maintenance of interactive communications privileges configured for entities outside the domain 12A, 12B. In this manner, the burden and complexity of maintaining interactive communications privileges may be alleviated from a domain administrator or other administrator.

For example, as discussed in more detail below, the interactive privilege functions 32A, 32B could be configured to automatically review interactive communications privileges configured for entities outside their domain 12A, 12B. This maintenance may involve queries to the entity inside the domain 12A, 12B to make selections regarding interactive communications privileges, similar to operations in FIGS. 5 and 6 discussed above. Interactive communications privileges configured for entities outside the domain 12A, 12B may also be maintained through autonomous mining of insight information of the entities outside the domain 12A, 12B. Mining of insight information for entities outside the domain 12A, 12B may be performed by the interactive privilege functions 32A, 32B upon initiation by an entity inside the domain 12A, 12B, or transparently to the entities inside the domain 12A, 12B. The interactive communications privileges configured for entities outside the domain 12A, 12B may also be maintained through automated receipt (e.g., asynchronous receipt) of updated insight information for the entities outside the domain 12A, 12B.

In this regard, FIG. 7 is a flowchart illustrating an exemplary process for self-maintaining interactive communications privileges for entities outside the domain 12A, 12B based on strength of relationship between the entities outside the domain 12A, 12B and entities inside the domain 12A, 12B. This process may be performed by the interactive privilege functions 32A, 32B. This process may be executed for each of the entities inside the domain 12A, 12B having interactive communications privileges configured for entities outside the domain 12A, 12B. This process may be executed periodically or continuously, as desired, to self-maintain the interactive communications privileges for entities outside the domain 12A, 12B. This process may also be executed autonomously from any other processes or tasks performed by the interactive privilege functions 32A, 32B.

With reference to FIG. 7, in this embodiment, the strength of the relationship between the entity inside the domain 12A, 12B and the entity outside the domain 12A, 12B is determined (block 700). The strength of the relationship between an entity inside the domain 12A, 12B and an entity outside the domain 12A, 12B is one way to judge whether the interactive communications privileges configured for the entity outside the domain 12A, 12B need to be reviewed and/or updated. For example, if this relationship is not strong, this may be an indication that the interactive communications privileges configured for the entity outside the domain 12A, 12B should be reviewed to determine if the interactive communications privileges are still viable, meaning retained as currently configured. As an example, a relationship score may be determined or calculated for a relationship between an entity inside a domain 12A, 12B and an entity outside the domain 12A, 12B (block 700) to determine viability of the relationship (block 702). For example, the last interaction parameter updated by the interactive privilege function 32A, 32B in block 301 in FIG. 3 discussed above may be used to determine the relationship score between an entity inside a domain 12A, 12B with an entity outside the domain 12A, 12B (block 700). The last interaction parameter can provide the last interactive communication between the entity inside the domain 12A, 12B and the entity outside the domain 12A, 12B. For example, the relationship score may be determined as an inverse relationship with the amount of time elapsed since the last interactive communication between an entity inside the domain 12A, 12B with an entity outside the domain 12A, 12B. In this example, the smaller the relationship score (i.e., the greater the elapsed time between the last communications between an entity inside the domain 12A, 12B and an entity outside the domain 12A, 12B), the less strong the relationship between an entity inside the domain 12A, 12B with an entity outside the domain 12A, 12B. One or more interactions between an entity inside a domain 12A, 12B with an entity outside the domain 12A, 12B may be used; however, typically, more than one interaction is used to determine a relationship score.

With continuing reference to FIG. 7, the interactive privilege function 32A, 32B can use the determined relationship score to determine the strength of a relationship between a given entity inside the domain 12A, 12B and an entity outside the domain 12A, 12B (block 702). For example, the interactive privilege function 32A, 32B may determine if the relationship score exceeds a predefined relationship score threshold. If so, the relationship may be deemed to be viable. In this example, a viable relationship means that the interactive communications privileges configured for the entity outside the domain 12A, 12B may not be further reviewed and updated. The process continues by reviewing other relationships between entities inside the domain 12A, 12B and entities outside the domain 12A, 12B (block 700). If, however, the relationship score indicates that a relationship between an entity inside the domain 12A, 12B and an entity outside the domain 12A, 12B is not viable, the interactive privilege function 32A, 32B may send a viability message 52 to the entity inside the domain 12A, 12B (block 704). An example of the viability message 52 is illustrated in FIG. 8.

Figure 8:
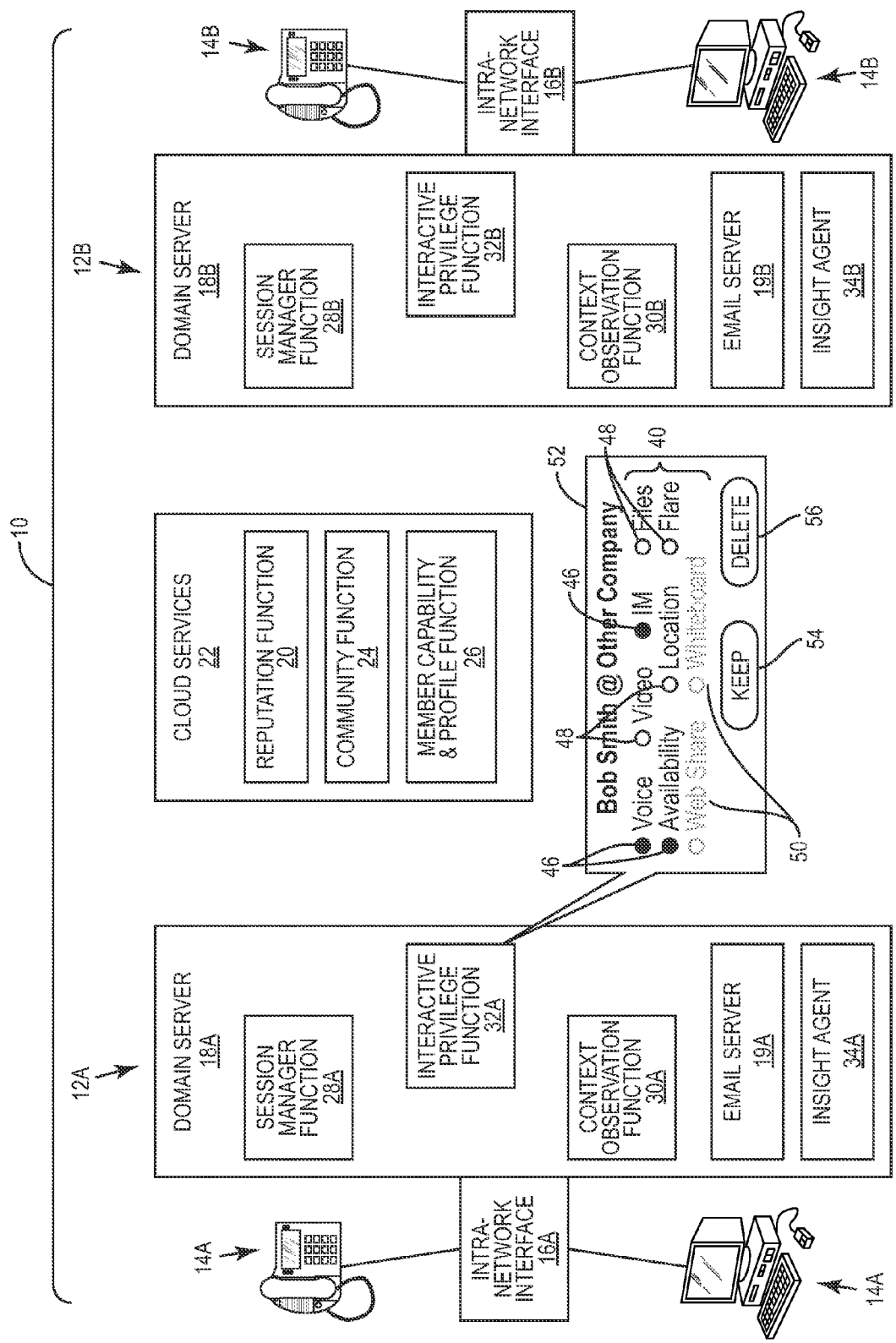
FIG. 8 is the exemplary system of FIG. 1 illustrating the exemplary interactive privilege function providing the option for an entity inside the domain to maintain or delete interactive communications privileges for an entity outside the domain.

With reference to FIG. 8, the viability message 52 sent by the interactive privilege function 32A to the entity inside the domain 12A is illustrated. In this example, the entity inside the domain 12A is user entity Ralph_Jones. The entity outside the domain 12B, as displayed in the viability message 52, is Bob_Smith@Other_Company. The viability message 52 indicates that Voice, IM, and Availability interactive communications privileges are currently configured as the interactive communications privileges 40 governing interactive communications between Ralph_Jones and Bob_Smith@Other_Company. Radio buttons 46 are automatically selected by the interactive privilege function 32A in the viability message 52 for the currently configured interactive communications privileges 40. The user entity inside the domain 12A, Ralph_Jones, can unselect (i.e., delete) any of the currently configured interactive communications privileges to no longer be included in the interactive communications privileges 40 configured for the user entity outside the domain 12B, Bob_Smith. In this manner, the interactive communications privileges 40 are self-maintained according to a relationship score that triggered the viability message 52 being sent to the user entity inside the domain 12A, Ralph_Jones.

For example, with continuing reference to FIG. 8, the user entity inside the domain 12A, Ralph_Jones, could unselect (i.e., delete) all of the interactive communications privileges 40 configured for the user entity outside the domain 12A, Bob_Smith. Alternatively, the user entity inside the domain 12A, Ralph_Jones, could unselect on a portion (i.e., a partial delete) of the interactive communications privileges 40 configured for the user entity outside the domain 12A, Bob_Smith. The interactive privilege functions 32A, 32B could be configured to allow the user entity inside the domain 12A, Ralph_Jones, to delete all interactive communications privileges for the entity outside the domain 12A, 12B, or only non-default interactive communications privileges. For example, the interactive privileges function 32A, 32B may be configured to allow default communications privileges (e.g., email and voice), for an entity outside the domain 12A, 12B regardless of selections by the entity inside the domain 12A, 12B.

With continuing reference to FIG. 8, radio buttons 48 not automatically selected by the interactive privilege function 32A, 32B indicate interactive communications privileges 40 that are allowed, and not currently configured for the user entity inside the domain 12A, Ralph_Jones. The user entity inside the domain 12A can select any of radio buttons 48 to add these interactive communications privileges as additional interactive communications privileges to the configured interactive communications privileges 40. Two interactive communications privileges in the viability message 52 in FIG. 8 "Web Share" and "Whiteboard," 50 are grayed out just as provided in the pop-up message 38 in FIG. 6. This means that the interactive privilege function 32A, is not recommending and/or allowing these interactive communications privileges to be selected by the user entity inside the domain 12A to be configured for the interactive communications privileges 40 for the user entity outside the domain 12A.

With continuing reference to FIG. 8, the user entity inside the domain 12A, Ralph_Jones, can choose to keep the currently configured and selected interactive communications privileges 40 by selecting either the "KEEP" button 54 (block 706 in FIG. 7). Any selected radio buttons 48 will be added and/or kept as additional interactive communications privileges configured for the user entity outside the domain 12A, Bob_Smith. Alternatively, the user entity inside the domain 12A, Ralph_Jones, can choose to delete the currently configured interactive communications privileges 40 by unselecting all selected radio buttons 46 or by simply selecting the "DELETE" button 56 (block 706 in FIG. 7). In this scenario, the interactive privilege function 32A deletes the selected interactive communications privileges configured for the entity outside the domain 12A, Bob_Smith, which are indicated by selected radio buttons 48 in the viability message 52 in FIG. 8 (block 708 in FIG. 7). In either scenario of keeping or deleting interactive communications privileges for an entity outside a domain 12A, 12B, the interactive privilege functions 32A, 32B will continue to analyze the strength of relationships between the entity inside the domain 12A, 12B and other entities outside the domain 12A, 12B and other relationships between other entities inside the domain 12A, 12B and entities outside the domain 12A, 12B (blocks 700-708 in FIG. 7).

The interactive privilege configurations configured for entities outside the domain 12A, 12B can be self-maintained in other ways. As discussed above, it may be desirable to review interactive communications privileges configured for entities outside a domain 12A, 12B to determine if those configurations should be maintained in whole or part, or not maintained. This review may be periodic or triggered based on other criteria or parameter(s). If it is determined not to maintain interactive communications privileges previously configured for an entity outside the domain 12A, 12B, the interactive communications privileges for the entity outside the domain 12A, 12B may be set to default communications privileges (e.g., email and voice). It may also be desirable to provide for automatic maintenance of interactive communications privileges configured for entities outside the domain 12A, 12B. In this manner, the burden and complexity of maintaining interactive communications privileges may be alleviated from a domain administrator or other administrator.

Figure 9A:
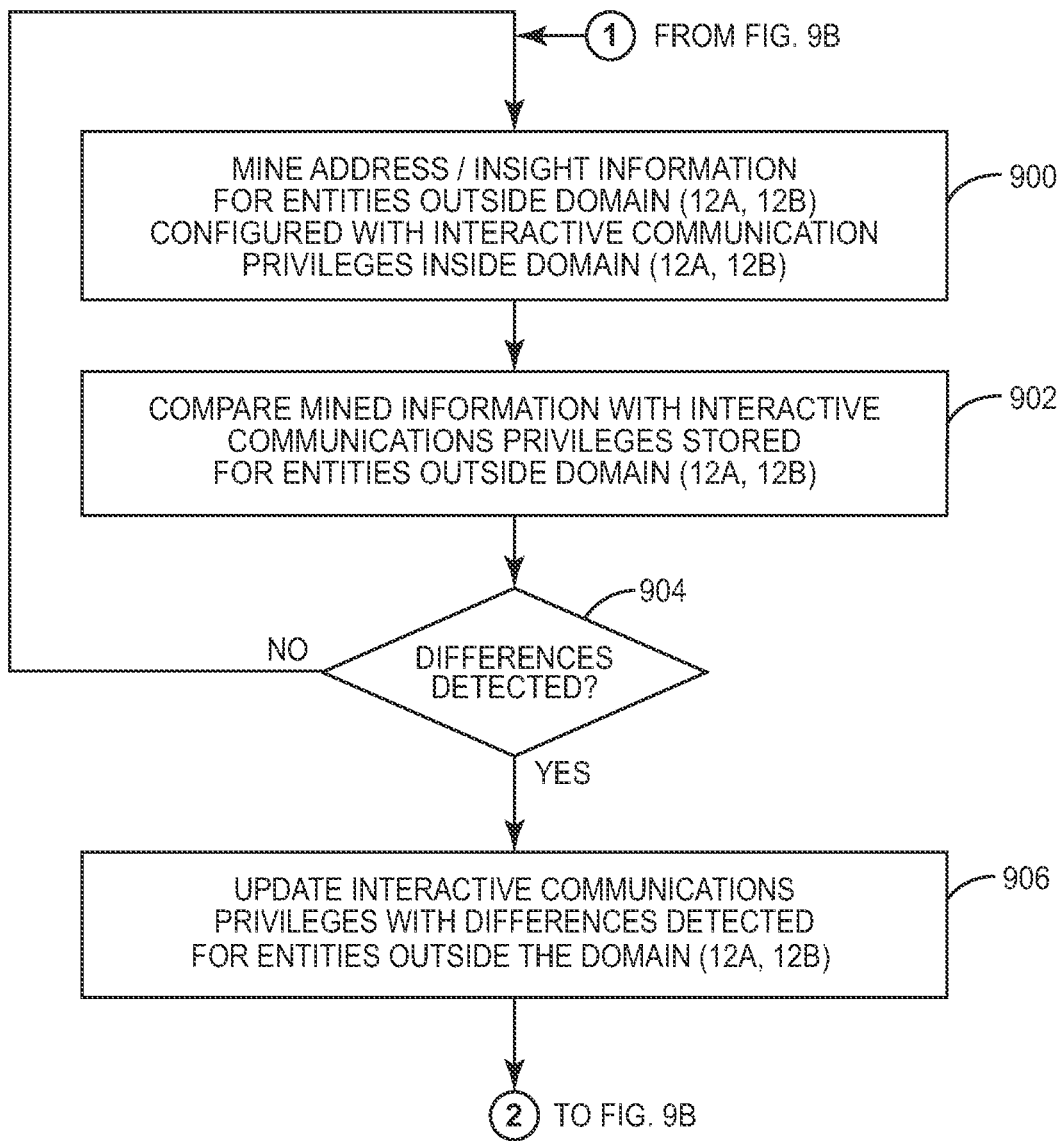
FIG. 9A is a flowchart illustrating an exemplary process of the interactive privilege function mining insight information for entities outside the domain to update interactive communications privileges for entities outside the domain.
Figure 9B:
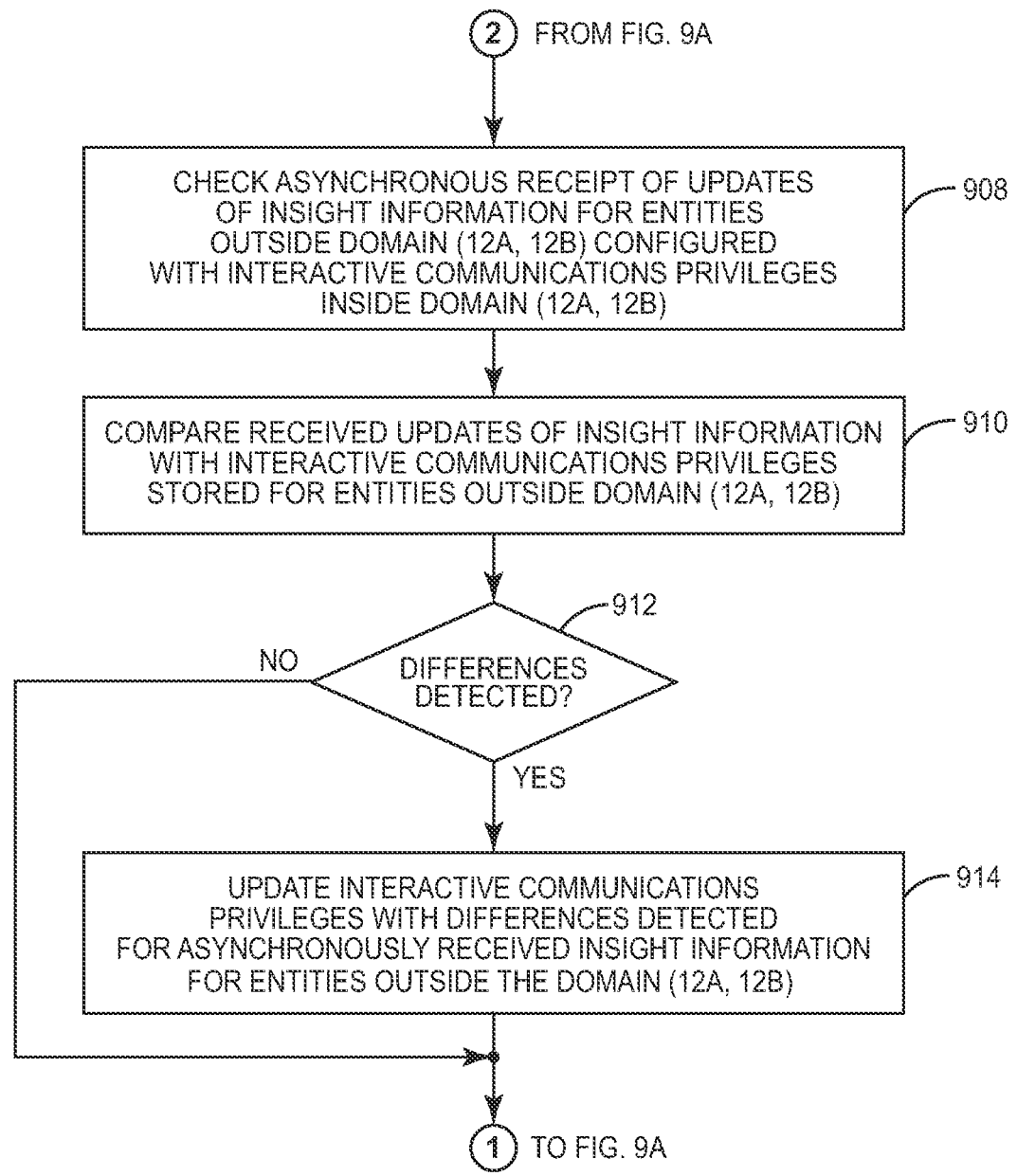
FIG. 9B is a flowchart illustrating an exemplary process of the interactive privilege function checking for asynchronously received updates of insight information for entities outside the domain to update interactive communications privileges for entities outside the domain.

In this regard, a non-limiting example, FIG. 9A is a flowchart illustrating an exemplary process of the interactive privilege function 32A, 32B mining insight information for entities outside the domain 12A, 12B to update interactive communications privileges for entities outside the domain 12A, 12B. FIG. 9B is a flowchart illustrating an exemplary process of the interactive privilege function 32A, 32B checking for asynchronously received updates of insight information for entities outside the domain 12A, 12B to update interactive communications privileges for entities outside the domain 12A, 12B. Either one or both of the processes illustrated in FIGS. 9A and 9B may be performed to self-maintain interactive communications privileges for entities outside a domain 12A, 12B. Further, the processes illustrated in FIGS. 9A and/or 9B may be performed to self-maintain interactive communications privileges for entities outside a domain 12A, 12B in addition to the processes illustrated in FIGS. 7 and 8 to determine relationship viability and allow entities inside a domain 12A, 12B to provide maintenance of interactive privilege communications.

In FIG. 9A, a process for autonomous mining of insight information of the entities outside the domain 12A, 12B to self-maintain interactive communications privileges is provided. The process may be performed by the interactive privilege function 32A, 32B. Mining of insight information for entities outside the domain 12A, 12B may be performed by the interactive privilege functions 32A, 32B in two non-limiting manners. The mining of insight information may be performed by the interactive privilege functions 32A, 32B upon initiation by an entity inside the domain 12A, 12B. Alternatively, the mining of insight information may be performed by the interactive privilege functions 32A, 32B without initiation or triggering of the request by an entity inside the domain 12A, 12B and transparently to the entities inside the domain 12A, 12B. The interactive privilege function 32A, 32B can perform the process in FIG. 9A autonomously to self-maintain interactive communications privileges for entities inside the domain 12A, 12B. The interactive privilege function 32A, 32B can repeat the process for all entities outside the domain 12A, 12B that have interactive privileges communications configured for interactive communications with entities inside the domain 12A, 12B.

With reference to FIG. 9A, the interactive privilege function 32A, 32B mines address and/or insight information for entities outside the domain 12A, 12B that are configured with interactive communications privileges inside the domain 12A, 12B (block 900). In this manner, any updates or changes to the address and/or insight information for an entity outside a domain 12A, 12B are retrieved and can be reviewed to determine if the interactive communications privileges for the entity outside the domain 12A, 12B should be updated and/or deleted. A change in address information of the entity outside the domain 12A, 12B can signify a change in domain, which may affect interactive communications privileges. As another example, insight information regarding the reputation, community, capability, and/or profile of the entity outside the domain 12A, 12B and/or its outside domain 12A, 12B, may have changed since the last configuration of interactive communications privileges for the entity outside the domain 12A, 12B. As another example, insight information for an entity outside the domain 12A, 12B may have been updated in the cloud services 22 since the last configuration of interactive communications privileges for the entity outside the domain 12A, 12B (e.g., see above and clouds services 22 in FIG. 4). As another example, insight information for an entity outside the domain 12A, 12B, retrievable through a call to the insight agent 34A, 34B of the outside domain 12A, 12B, may have been updated in the outside domain 12A, 12B since the last configuration of interactive communications privileges for the entity outside the domain 12A, 12B (e.g., see above and FIG. 4).

With continuing reference to FIG. 9A, the interactive privilege function 32A, 32B compares the mined information with the current interactive communications privileges configured for the entity outside the domain 12A, 12B (block 902). If differences are not detected between the mined information and the interactive communications privileges configured for the entity outside the domain 12A, 12B (block 904), the interactive communications privileges configured for the entity outside the domain 12A, 12B can be maintained with alteration. The process then repeats for other entities outside the domain 12A, 12B (block 900). If, however, differences are detected between the mined information and the interactive communications privileges configured for the entity outside the domain 12A, 12B (block 904), the interactive privilege function 32A, 32B can update the interactive communications privileges for the entity outside the domain 12A, 12B (block 906). The interactive privilege function 32A, 32B can update the interactive communications privileges for the entity outside the domain 12A, 12B according to any of the embodiments discussed above with regard to FIGS. 1-6, as non-limiting examples.

The interactive communications privileges configured for entities outside the domain 12A, 12B may also be maintained through automated receipt (e.g., asynchronous receipt) of updated insight information for the entities outside the domain 12A, 12B. In this regard, FIG. 9B is a flowchart illustrating an exemplary process of the interactive privilege function 32A, 32B checking for asynchronously received updates of insight information for entities outside the domain 12A, 12B to update interactive communications privileges for entities outside the domain 12A, 12B. In this embodiment, the interactive privilege function 32A, 32B can check for asynchronous receipt of updates of insight information by the domain 12A, 12B for entities outside the domain 12A, 12B having interactive communications privileges configured for entities inside the domain 12A, 12B (block 908). For example, the domain 12A, 12B may receive insight information regarding the reputation, community, capability, and/or profile of the entity outside the domain 12A, 12B and/or its outside domain 12A, 12B. As another example, the domain 12A, 12B may receive insight information for an entity outside the domain 12A, 12B from the cloud services 22 (e.g., see above and clouds services 22 in FIG. 4). As another example, the domain 12A, 12B may receive insight information for an entity outside the domain 12A, 12B, from the insight agent 34A, 34B of the outside domain 12A, 12B (e.g., see above and FIG. 4).

With continuing reference to FIG. 9B, the interactive privilege function 32A, 32B compares the received updates of insight information with the current interactive communications privileges configured for the entity outside the domain 12A, 12B (block 910). If differences are not detected between the mined information and the interactive communications privileges configured for the entity outside the domain 12A, 12B (block 912), the interactive communications privileges configured for the entity outside the domain 12A, 12B can be maintained without alteration. The process then repeats for other entities outside the domain 12A, 12B by returning back to block 900 in FIG. 9A, or alternatively block 908 in FIG. 9B. If, however, differences are detected between the mined information and the interactive communications privileges configured for the entity outside the domain 12A, 12B (block 912 in FIG. 9B), the interactive privilege function 32A, 32B can update the interactive communications privileges for the entity outside the domain 12A, 12B based on the received updated insight information (block 914). The interactive privilege function 32A, 32B can update the interactive communications privileges for the entity outside the domain 12A, 12B according to any of the embodiments discussed above with regard to FIGS. 1-6, as non-limiting examples.

Figure 10:
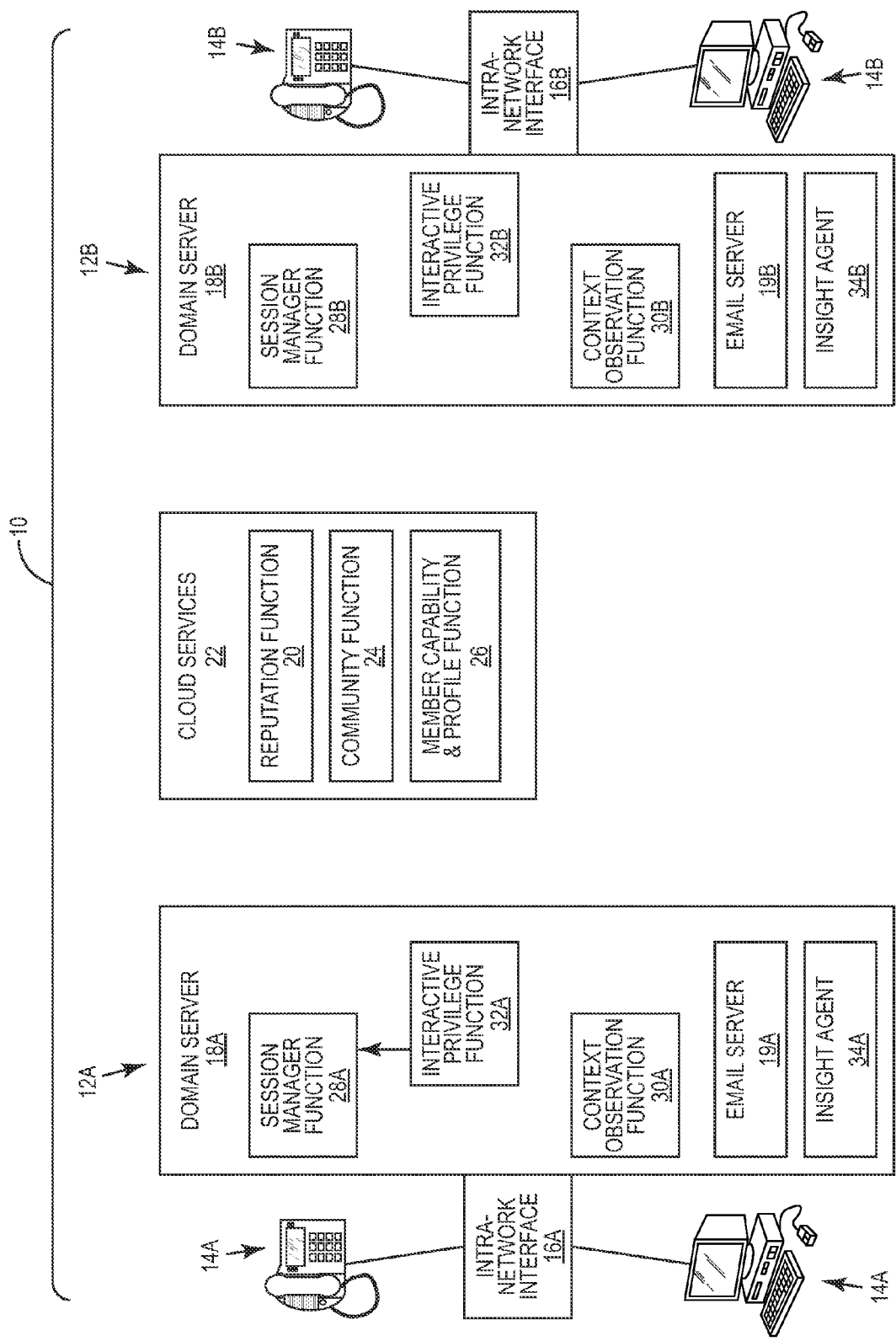
FIG. 10 is the exemplary system of FIG. 1 illustrating the exemplary session manager function configured to establish interactive communications between an entity inside the domain and an entity outside the domain based on interactive communications privileges configured for the outside the domain.

As discussed above, the interactive communications privileges will be used to determine whether a particular type of interactive communications session will be allowed to be established by a domain server 18A, 18B. In this regard, FIG. 10 illustrates the system 10 wherein the session manager functions 28A, 28B call upon the interactive privilege functions 32A, 32B in their respective domain servers 18A, 18B when a request for interactive communications involves an entity outside their respective domains 12A, 12B. The interactive privilege function 32A, 32B provides the interactive privilege function for the entity outside the domain 12A, 12B to determine if the requested interactive communications should be allowed to be established between an entity inside the domain 12A, 12B and an entity outside the domain 12A, 12B. In this regard, FIG. 11 is an exemplary flowchart that illustrates an exemplary processing performed by the session manager functions 28A, 28B to process a request for establishment of interactive communications involving entities inside their respective domains 12A, 12B.

Figure 11:
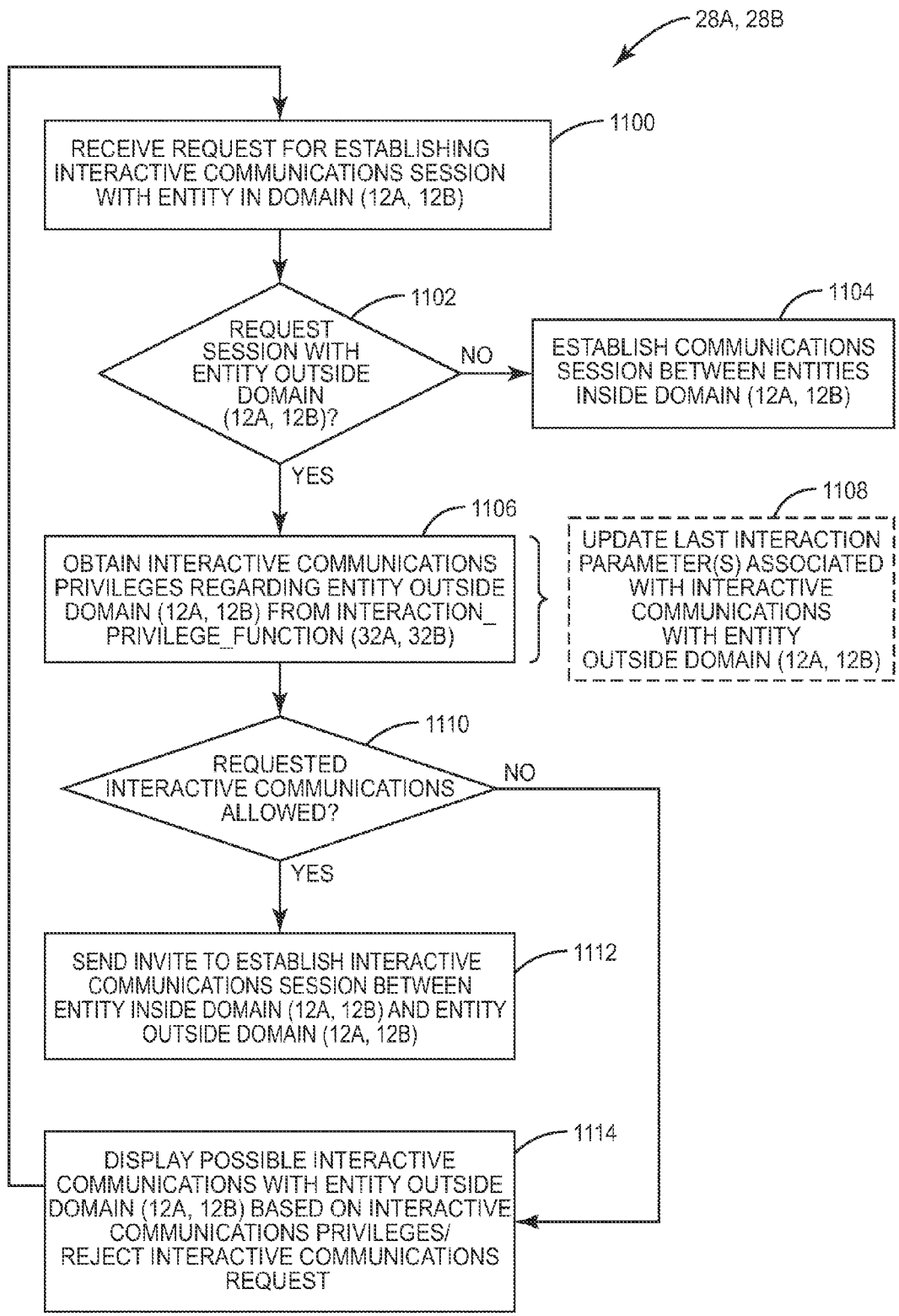
FIG. 11 is a flowchart illustrating an exemplary session manager function receiving a request for establishing an interactive communications session between an entity inside the domain and an entity outside the domain and determining if the interactive communications session is allowed based on the interactive communications privileges configured for the entity outside the domain.

With reference to FIG. 11, the session manager function 28A, 28B receives a request for establishing an interactive communications session with a party in its respective domain 12A, 12B (block 1100). The session manager function 28A, 28B determines if the interactive communications request involves an entity outside its respective domain 12A, 12B (block 1102). If no, the interactive communications request is between entities in the same domain 12A, 12B and is established without regard to the interactive communications privileges (block 1104). If the interactive communications request involves an entity outside a domain 12A, 12B, the interactive communications privileges that are established and have been self-learned will be used to determine if the establishment of the interactive communications request involving the entity outside the domain 12A, 12B will be allowed by the respective session manager function 28A, 28B (block 1106). The session manager function 28A, 28B obtains the interactive communications privileges regarding the entity outside the domain 12A, 12B by calling upon their respective interactive privilege function 32A, 32B (block 1106). The interactive privilege function 32A, 32B can update the last interaction parameter associated with the interactive communication with the entity outside the domain 12A, 12B when called by the session manager function 28A, 28B (block 1108). As previously discussed, the last interaction parameter(s) can be used to determine whether one or more interactive communications privileges for an entity outside the domain 12A, 12B should be maintained.

With continuing reference to FIG. 11, if the requested interactive communications are allowed according to the interactive communications privileges for the entity outside the domain 12A, 12B (block 1110), the session manager function 28A, 28B allows or facilitates establishment of the interactive communications session between the entity inside the domain 12A, 12B and the entity outside the domain 12A, 12B (block 1112). An invite may be sent by the session manager function 28A, 28B to the entity outside the domain 12A, 12B to establish an interactive communications session between the entity inside the domain 12A, 12B and the entity outside the domain 12A, 12B (block 1112). If however, the requested interactive communications are not allowed according to the interactive communications privileges for the entity outside the domain 12A, 12B (block 1110), the requested interactive communications session is not established (block 1114). In this scenario, for outbound communications requests from the entity inside the domain 12A, 12B to the entity outside the domain 12A, 12B, the possible interactive communications with the entity outside the domain 12A, 12B based on the interactive communications privileges may be displayed to the entity inside the domain 12A, 12B for future outbound communications requests (block 1114). In this scenario, for inbound communications requests from an entity outside the domain 12A, 12B to the entity inside the domain, the communications request may be simply rejected (block 1114).

Figure 12:
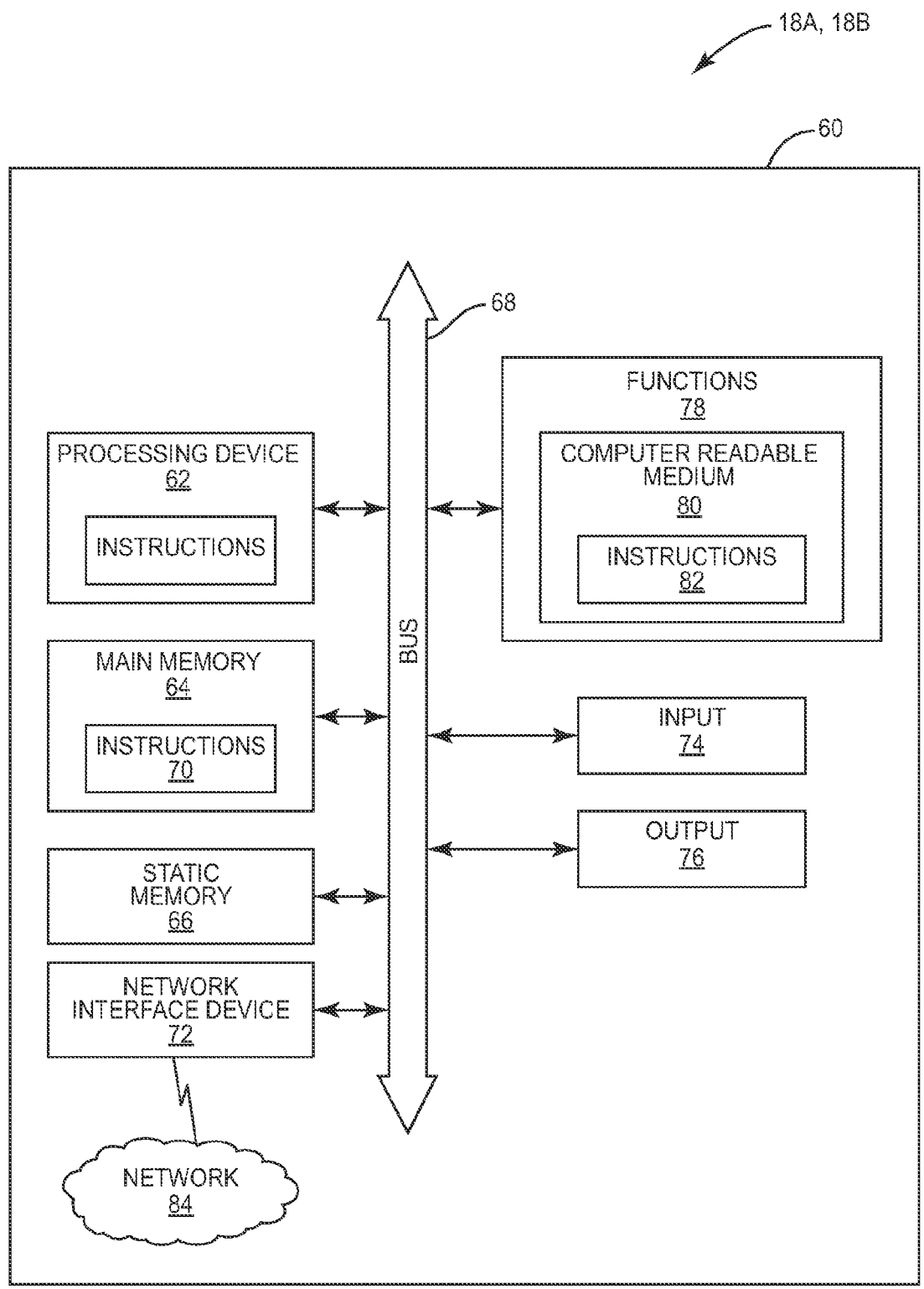
FIG. 12 is a schematic diagram representation of an exemplary domain server in the system in FIG. 1 and configured to execute instructions from an exemplary computer-readable medium to perform the functions described herein.

FIG. 12 is a schematic diagram representation of domain server 18A, 18B in the exemplary form of an exemplary computer system 60 adapted to execute instructions from an exemplary computer-readable medium to perform the functions described herein. In this regard, the domain server 18A, 18B may comprise the computer system 60 within which a set of instructions for causing the domain server 18A, 18B to perform any one or more of the methodologies discussed herein may be executed. The domain server 18A, 18B may be connected (e.g., networked) to other machines in a local area network (LAN), an intranet, an extranet, or the Internet. The domain server 18A, 18B may operate in a client-server network environment, or as a peer machine in a peer-to-peer (or distributed) network environment. While only a single domain server 18A, 18B is illustrated, the term "server" shall also be taken to include any collection of machines that individually or jointly execute a set (or multiple sets) of instructions to perform any one or more of the methodologies discussed herein. The domain server 18A, 18B may be a server, a personal computer, a desktop computer, a laptop computer, a personal digital assistant (PDA), a computing pad, a mobile device, or any other device and may represent, for example, a server or a user's computer.

The exemplary computer system 60 includes a processing device or processor 62, a main memory 64 (e.g., read-only memory (ROM), flash memory, dynamic random access memory (DRAM) such as synchronous DRAM (SDRAM), etc.), and a static memory 66 (e.g., flash memory, static random access memory (SRAM), etc.), which may communicate with each other via a bus 68. Alternatively, the processing device 62 may be connected to the main memory 64 and/or static memory 66 directly or via some other connectivity means.

The processing device 62 represents one or more processing devices such as a microprocessor, central processing unit, or the like. More particularly, the processing device 62 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 62 is configured to execute processing logic in instructions 70 for performing the operations and steps discussed herein.

The computer system 60 may further include a communications interface in the form of a network interface device 72. It also may or may not include an input 74 to receive input and selections to be communicated to the computer system 60 when executing instructions. It also may or may not include an output 76, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 60 may or may not include a data storage device that includes functions 78 stored in a computer-readable medium 80 on which is stored one or more sets of instructions 82 (e.g., software) embodying any one or more of the methodologies or functions described herein. The functions 78 can include the session manager function 28A, 28B, the interactive privilege function 32A, 32B, the context observation function 30A, 30B, and the insight agent 34A, 34B as examples. The instructions 82 may also reside, completely or at least partially, within the main memory 64 and/or within the processing device 62 during execution thereof by the computer system 60, the main memory 64 and the processing device 62 also constituting machine-accessible storage media. The instructions 82 may further be transmitted or received over a network 84 via the network interface device 72. The network 84 can be an intra-network or an inter-network.

While the computer-readable medium 80 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the embodiments disclosed herein. The term "machine-accessible storage medium" shall accordingly be taken to include, but not be limited to, solid-state memories, optical and magnetic media, and carrier wave signals.

The devices, systems, methods, and computer-readable mediums arbitrating bus transactions on a communications bus based on bus device health information according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for self-maintaining interactive communications privileges governing communications with an entity outside a domain, comprising:
    receiving, by a control system circuit of a computer processor, an update to at least one stored self-learned interactive communications privilege configured for an entity outside a domain governing interactive communications with an entity inside the domain, wherein the update comprises mined insight information for the entity outside the domain;
    in response to receiving the update to the at least one stored self-learned interactive communications privilege, determining whether to maintain the at least one stored self-learned interactive communications privilege configured for the entity outside the domain by comparing the mined insight information with the at least one stored self-learned interactive communications privilege configured for the entity outside the domain;
    if the at least one stored self-learned interactive communications privilege is determined to be maintained, maintaining the update to the at least one stored self-learned interactive communications privilege configured for the entity outside the domain governing interactive communications with the entity inside the domain; and
    if the at least one stored self-learned interactive communications privilege is determined to not be maintained, deleting one or more stored self-learned interactive communications privileges among the at least one stored self-learned interactive communications privilege configured for the entity outside the domain governing interactive communications with the entity inside the domain.

2. The method of claim 1, wherein maintaining the at least one stored self-learned interactive communications privilege comprises maintaining all of the at least one stored self-learned interactive communications privilege configured for the entity outside the domain governing interactive communications with the entity inside the domain.

3. The method of claim 1, wherein maintaining the at least one stored self-learned interactive communications privilege comprises maintaining less than all of the at least one stored self-learned interactive communications privilege configured for the entity outside the domain governing interactive communications with the entity inside the domain.

4. The method of claim 1, wherein maintaining the at least one stored self-learned interactive communications privilege further comprises configuring one or more additional stored self-learned interactive communications privileges for the entity outside the domain.

5. The method of claim 1, wherein deleting the one or more stored self-learned interactive communications privileges comprises deleting non-default stored self-learned interactive communications privileges configured in the domain for the entity outside the domain governing interactive communications with the entity inside the domain.

6. The method of claim 1, wherein deleting the one or more stored self-learned interactive communications privileges comprises maintaining only default stored self-learned interactive communications privileges configured for the entity outside the domain governing interactive communications with the entity inside the domain.

7. The method of claim 1, further comprising configuring one or more additional stored self-learned interactive communications privileges for the entity outside the domain.

8. The method of claim 1, wherein receiving the update to the at least one stored self-learned interactive communications privilege comprises receiving a selection from the entity inside the domain.

9. The method of claim 8, comprising receiving the update to the at least one stored self-learned interactive communications privilege from the selection to a viability message from the entity inside the domain.

10. The method of claim 9, further comprising:
determining a strength of a relationship between the entity inside the domain and the entity outside the domain;
determining if the relationship between the entity inside the domain and the entity outside the domain is viable based on the strength of the relationship; and
if the relationship between the entity inside the domain and the entity outside the domain is determined to not be viable, sending the viability message to the entity inside the domain with stored self-learned interactive communications privileges configured for the entity outside the domain.

11. The method of claim 10, wherein the strength of the relationship is based on at least one last interaction regarding a last interactive communication between the entity inside the domain and the entity outside the domain.

12. The method of claim 1, wherein receiving the update to the at least one stored self-learned interactive communications privilege comprises receiving a mined update of the at least one stored self-learned interactive communications privilege configured for the entity outside the domain governing interactive communications with the entity inside the domain.

13. The method of claim 12, further comprising:
providing the mined update of the at least one stored self-learned interactive communications privilege if differences are detected between a comparison of the mined insight information and the at least one stored self-learned interactive communications privilege configured for the entity outside the domain.

14. The method of claim 1, wherein receiving the update to the at least one stored self-learned interactive communications privilege comprises receiving the update of the at least one stored self-learned interactive communications privilege based on an asynchronous update of the at least one stored self-learned interactive communications privilege.

15. The method of claim 1, further comprising:
receiving a request for establishing a communications session between the entity outside the domain and the entity inside the domain;
reviewing the at least one stored self-learned interactive communications privilege for the entity outside the domain; and
determining if the at least one stored self-learned interactive communications privilege allows the requested communications session between the entity outside the domain and the entity inside the domain.

16. The method of claim 15, further comprising establishing the requested communications session between the entity outside the domain and the entity inside the domain if the at least one stored self-learned interactive communications privilege allows the requested communications session between the entity outside the domain and the entity inside the domain.

17. A system for self-maintaining interactive communications privileges governing communications with an entity outside a domain comprising:
at least one communications interface device associated with a domain; and
a control system circuit associated with the at least one communications interface device and the domain, the control system circuit configured to:
receive an update to at least one stored self-learned interactive communications privilege configured for an entity outside the domain governing interactive communications with an entity inside the domain, wherein the update comprises mined insight information for the entity outside the domain;
in response to receipt of the update to the at least one stored self-learned interactive communications privilege, determine whether to maintain the at least one stored self-learned interactive communications privilege configured for the entity outside the domain by comparing the mined insight information with the at least one stored self-learned interactive communications privilege configured for the entity outside the domain;
if the at least one stored self-learned interactive communications privilege is determined to be maintained, maintain the update to the at least one stored self-learned interactive communications privilege configured for the entity outside the domain governing interactive communications with the entity inside the domain; and
if the at least one stored self-learned interactive communications privilege is determined to not be maintained, delete one or more stored self-learned interactive communications privileges among the at least one stored self-learned interactive communications privilege configured for the entity outside the domain governing interactive communications with the entity inside the domain.

18. A non-transitory computer-readable medium comprising computer executable instructions stored as self-learned thereon to cause a control system associated with at least one communications interface and a domain to:
receive an update to at least one stored self-learned interactive communications privilege configured for an entity outside a domain governing interactive communications with an entity inside the domain, wherein the update comprises mined insight information for the entity outside the domain;
in response to receipt of the update to the at least one stored self-learned interactive communications privilege, determine whether to maintain the at least one stored self-learned interactive communications privilege configured for the entity outside the domain by comparing the mined insight information with the at least one stored self-learned interactive communications privilege configured for the entity outside the domain;
if the at least one stored self-learned interactive communications privilege is determined to be maintained, maintain the update to the at least one stored self-learned interactive communications privilege configured for the entity outside the domain governing interactive communications with the entity inside the domain; and
if the at least one stored self-learned interactive communications privilege is determined to not be maintained, delete one or more stored self-learned interactive communications privileges among the at least one stored self-learned interactive communications privilege configured for the entity outside the domain governing interactive communications with the entity inside the domain.

* * * * *